(12) United States Patent
Minami et al.

(10) Patent No.: US 11,205,903 B2
(45) Date of Patent: Dec. 21, 2021

(54) APPARATUS, EVALUATION METHOD, AND NON-TRANSITORY STORAGE MEDIUM

(71) Applicant: NEC Corporation, Tokyo (JP)

(72) Inventors: Kouichi Minami, Tokyo (JP); Hidekazu Kimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 647 days.

(21) Appl. No.: 16/080,939

(22) PCT Filed: Feb. 10, 2017

(86) PCT No.: PCT/JP2017/004874
§ 371 (c)(1),
(2) Date: Aug. 29, 2018

(87) PCT Pub. No.: WO2017/150140
PCT Pub. Date: Sep. 8, 2017

(65) Prior Publication Data
US 2021/0203167 A1    Jul. 1, 2021

(30) Foreign Application Priority Data

Mar. 4, 2016  (JP) .............................. JP2016-042202

(51) Int. Cl.
*H02J 3/46*    (2006.01)
*H02J 13/00*   (2006.01)

(52) U.S. Cl.
CPC .............. *H02J 3/472* (2020.01); *H02J 3/466* (2020.01); *H02J 13/00002* (2020.01)

(58) Field of Classification Search
CPC .... H02J 3/472; H02J 3/466; H02J 3/46; H02J 13/00002; H02J 13/00
(Continued)

(56) References Cited

U.S. PATENT DOCUMENTS

2013/0093384 A1 * 4/2013 Nyu .......................... H02J 7/00
                                                              320/107
2013/0245850 A1   9/2013 Okayama et al.

FOREIGN PATENT DOCUMENTS

JP     2004-273316    9/2004
JP     2012-253976    12/2012
(Continued)

OTHER PUBLICATIONS

International Search Report dated Apr. 18, 2017, in corresponding PCT International Application.

*Primary Examiner* — Hal Kaplan

(57) ABSTRACT

Provided is a server (10) having an attribute information receiving unit (15) which receives attribute information of an electric power output apparatus (30) having a function of outputting electric power from the electric power output apparatus (30); an output condition transmitting unit (18) which transmits an output condition determined in accordance with the attribute information to the electric power output apparatus (30); an analysis result receiving unit (16) which receives a processing result obtained by performing predetermined processing on output waveform data at the time when the electric power output apparatus (30) outputs electric power according to the output condition; and an evaluating unit (17) which calculates an electric power output performance of the electric power output apparatus (30) on the basis of the processing result and the output condition.

15 Claims, 13 Drawing Sheets

(58) Field of Classification Search
USPC .......................................................... 702/64
See application file for complete search history.

(56) References Cited

FOREIGN PATENT DOCUMENTS

| | | |
|---|---|---|
| JP | 2013-029445 | 2/2013 |
| JP | 2013-192401 | 9/2013 |
| WO | WO 2012/056581 | 5/2012 |

* cited by examiner

FIG. 4

| OUTPUT CONDITION ID | ACTIVE ELECTRIC POWER | REACTIVE ELECTRIC POWER | VOLTAGE | FREQUENCY | RAMP | ... |
|---|---|---|---|---|---|---|
| .... | .... | .... | .... | .... | .... | .... |

FIG. 5

| ELECTRIC POWER OUTPUT PROCESSING (MODEL NAME) | OUTPUT CONDITION ID |
|---|---|
| ABC0001 | ... |
| ⋮ | ⋮ |

FIG. 6

| OUTPUT CONDITION ID : ..... | | | | | |
|---|---|---|---|---|---|
| ALLOWABLE RANGE | | | | | |
| ABC0001 | | | BQ32CC | | |
| ACTIVE ELECTRIC POWER | REACTIVE ELECTRIC POWER | ... | ACTIVE ELECTRIC POWER | REACTIVE ELECTRIC POWER | ... |
| .... | .... | .... | .... | .... | .... |
| .... | .... | .... | .... | .... | .... |

APPARATUS, EVALUATION METHOD, AND NON-TRANSITORY STORAGE MEDIUM

CROSS-REFERENCE TO RELATED PATENT APPLICATIONS

This application is a National Stage Entry of International Application No. PCT/JP2017/004874, filed Feb. 10, 2017, which claims priority from Japanese Patent Application No. 2016-042202, filed Mar. 4, 2016. The entire contents of the above-referenced applications are expressly incorporated herein by reference.

TECHNICAL FIELD

The present invention relates to a terminal apparatus, a control apparatus, a server, an evaluation method, and a program.

BACKGROUND ART

Various electric power output apparatuses (for example, a storage battery, an electric power generation apparatus, and the like) on the demand side are connected to an electric power distribution network through devices such as a Home Energy Management System (HEMS) and distribution boards. An electric power company has received, from a manufacturer of the various electric power output apparatuses, information related to a manufacturer name, a model name, a rated capacity, a rated electric power, and the like of each apparatus, and has performed an examination conforming to interconnection regulations on each apparatus. After going through such an examination, each apparatus was connected to the electric power distribution network, and each apparatus has been used for a service operation such as demand response.

Related techniques are disclosed in Patent Documents 1 and 2.

Patent Document 1 discloses a battery management apparatus that manages one or plural storage batteries, and includes a State Of Charge (SOC) reliability calculation unit which calculates a SOC reliability which is an index representing the reliability of the calculated SOC of the storage battery, and a SOC reliability determination unit which determines whether or not the calculated SOC is reliable on the basis of a calculation result obtained by the SOC reliability calculation unit. In the invention, any one of the number of cycles in which charging and discharging is counted as one cycle, an elapsed time, a State of Health (SOH) and a charging and discharging integrated amount is accumulated as a parameter. Then, the SOC reliability calculation unit calculates the SOC reliability on the basis of the accumulated parameter.

Patent Document 2 discloses a charging and discharging control apparatus including: a charging and discharging unit which is connected to an in-vehicle storage battery and performs charging or discharging on the in-vehicle storage battery, a storage unit which stores identification information for each of plural types of in-vehicle storage batteries and characteristic information indicating a predetermined characteristic of a corresponding type of in-vehicle storage battery in association with each other, an information acquiring unit which acquires target identification information which is identification information of a target in-vehicle storage battery connected to the charging and discharging unit from the outside, and a charging and discharging control unit which executes charging control or discharging control on the charging and discharging unit, on the basis of the target characteristic information associated with the target identification information among the characteristic information stored in the storage unit.

RELATED DOCUMENT

Patent Document

[Patent Document 1] Japanese Patent Application Publication No. 2013-29445

[Patent Document 2] Japanese Patent Application Publication No. 2012-253976

SUMMARY OF THE INVENTION

Technical Problem

In the future, it is expected that a rapid increase in number of electric power output apparatuses connected to the electric power distribution network will make it physically difficult to perform the above-described examination (examination or the like conforming to interconnection regulations) on all electric power output apparatuses. In a case where electric power output apparatuses are allowed to be connected to the electric power distribution network without going through the examination, an electric output apparatus of poor quality may be also connected to the electric power distribution network. The long-term use of the electric power output apparatus results in the deterioration of quality. Such an electric power output apparatus of deteriorated quality may be connected to the electric power distribution network as well.

Even though an electric power output apparatus of poor or deteriorated quality performs, for example, an output operation according to an output request specifying an output value (W) from an electric power company, actual output may fall below the specified output value. In a case where such a situation occurs, it may be difficult to operate a service such as demand response.

The technique described in Patent Document 1 evaluates a SOH, that is, a kind of direct current characteristic. However, the technique described in Patent Document 1 cannot evaluate an output performance, that is, perform an evaluation of the performance of a power conditioner. The technique described in Patent Document 2 does not disclose any means for resolving the problem either.

An object of the present invention is to provide means for solving the problem.

Solution to Problem

According to the present invention, there is provided a control apparatus including: an attribute information receiving unit which receives attribute information of an electric power output apparatus having a function of outputting electric power from the electric power output apparatus;

an output condition transmitting unit which transmits an output condition determined in accordance with the attribute information to the electric power output apparatus;

a processing result receiving unit which receives a processing result obtained by performing predetermined processing on output waveform data at the time when the electric power output apparatus outputs electric power according to the output condition; and an evaluating unit which calculates a reliability of an electric power output performance of the electric power output apparatus on the basis of the processing result and the output condition.

According to the present invention, there is provided a server having the control apparatus. The server may be, for example, a server in a cloud (so-called cloud server).

According to the present invention, there is provided a terminal apparatus including:

an attribute information receiving unit which receives attribute information of an electric power output apparatus having a function of outputting electric power from the electric power output apparatus;

an output condition transmitting unit which transmits an output condition determined in accordance with the attribute information to the electric power output apparatus;

an output data receiving unit which receives output waveform data at the time when the electric power output apparatus outputs electric power according to the output condition; and an evaluating unit which calculates a reliability of an electric power output performance of the electric power output apparatus on the basis of the output waveform data and the output condition.

According to the present invention, there is provided an evaluation method which is executed by a computer, including:

an attribute information receiving step of receiving attribute information of an electric power output apparatus having a function of outputting electric power from the electric power output apparatus;

an output condition transmitting step of transmitting, to the electric power output apparatus, an output condition determined in accordance with the attribute information;

a processing result receiving step of receiving a processing result obtained by performing predetermined processing on output waveform data at the time when the electric power output apparatus outputs electric power according to the output condition;

an evaluating step of calculating a reliability of an electric power output performance of the electric power output apparatus on the basis of the processing result and the output condition.

According to the present invention, there is provided an evaluation method which is executed by a computer, including:

an attribute information receiving step of receiving attribute information of an electric power output apparatus having a function of outputting electric power from the electric power output apparatus;

an output condition transmitting step of transmitting, to the electric power output apparatus, an output condition determined in accordance with the attribute information;

an output data receiving step of receiving output waveform data at the time when the electric power output apparatus outputs electric power according to the output condition; and an evaluating step of calculating a reliability of an electric power output performance of the electric power output apparatus on the basis of the output waveform data and the output condition.

According to the present invention, there is provided a program that causes a computer to function as:

an attribute information receiving unit which receives attribute information of an electric power output apparatus having a function of outputting electric power from the electric power output apparatus;

an output condition transmitting unit which transmits, to the electric power output apparatus, an output condition determined in accordance with the attribute information;

a processing result receiving unit which receives a processing result obtained by performing predetermined processing on output waveform data at the time when the electric power output apparatus outputs electric power according to the output condition; and an evaluating unit which calculates a reliability of an electric power output performance of the electric power output apparatus on the basis of the processing result and the output condition.

According to the present invention, there is provided a program that causes a computer to function as:

an attribute information receiving unit which receives attribute information of an electric power output apparatus having a function of outputting electric power from the electric power output apparatus;

an output condition transmitting unit which transmits, to the electric power output apparatus, an output condition determined in accordance with the attribute information;

an output data receiving unit which receives output waveform data at the time when the electric power output apparatus outputs electric power according to the output condition; and an evaluating unit which calculates a reliability of an electric power output performance of the electric power output apparatus on the basis of the output waveform data and the output condition.

Advantageous Effects of Invention

According to the present invention, a technique for evaluating an output performance of an electric power output apparatus connected to an electric power distribution network is realized.

BRIEF DESCRIPTION OF THE DRAWINGS

The above objects and other objects, features and advantages will become more apparent from the following description of the preferred example embodiments and the accompanying drawings below.

FIG. 4 is a diagram schematically illustrating an example of information managed by a server according to the example embodiment.

FIG. 5 is a diagram schematically illustrating an example of information managed by a server according to the example embodiment.

FIG. 6 is a diagram schematically illustrating an example of information managed by a server according to the example embodiment.

DESCRIPTION OF EMBODIMENTS

First, an example of the hardware configuration of the apparatuses (a terminal apparatus and a server) of the example embodiment will be described. Each unit provided by the apparatus according to the example embodiment is realized using any combination of hardware and software of any computer focusing on a Central Processing Unit (CPU), a memory, a program to be loaded into the memory, and a storage unit such as a hard disk which stores the program (which stores programs downloaded from a storage medium such as a Compact Disc (CD), or a server, and the like on the Internet, in addition to a program stored in advance from the stage of shipping the apparatus), and a network connection interface. It is understood by those skilled in the art that there are various modification examples to the realization method and apparatus.

Figure 1:
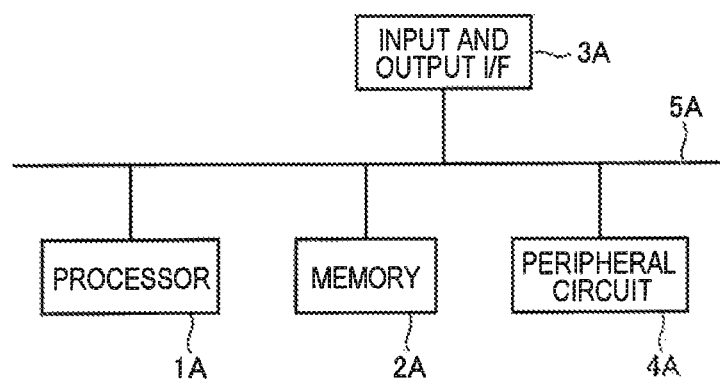
FIG. 1 is a diagram conceptually illustrating an example of a hardware configuration of an apparatus according to an example embodiment.

FIG. 1 is a block diagram illustrating a hardware configuration of the apparatus according to the example embodiment. As illustrated in FIG. 1, the apparatus has a processor 1A, a memory 2A, an input and output interface 3A, a peripheral circuit 4A, and a bus 5A. The peripheral circuit includes various modules.

The bus 5A is a data transmission path through which the processor 1A, the memory 2A, the peripheral circuit 4A and the input and output interface 3A mutually transmit and receive data. The processor 1A is an arithmetic processing apparatus such as a Central Processing Unit (CPU) or a Graphics Processing Unit (GPU). The memory 2A is a memory such as a Random Access Memory (RAM) or a Read Only Memory (ROM). The input and output interface 3A includes an interface for acquiring information from an external apparatus, an external server, an external sensor, or the like. The processor 1A issues a command to each module and performs an operation on the basis of arithmetic results.

In the present specification, "receiving" includes at least one of (actively receiving) that an apparatus itself acquires data or information stored in another apparatus or a storage medium, for example, that the apparatus itself receives data or information by making a request or inquiry to another apparatus, or reads out data or information by making an access to another apparatus or a storage medium, or the like, and (passively receiving) that data or information output from another apparatus is input to the apparatus, for example, that distributed (or transmitted, push notified, and the like) data or information are received, or the like. The "receiving" also includes selecting and acquiring data or information from among the received data or information, or selecting and receiving the distributed data or information.

Hereinafter, the example embodiment will be described. Note that, the functional block diagrams used in the description of the example embodiments below are not illustrated as a unit of a hardware configuration but a functional unit of a block. In these drawings, it is described that each apparatus is realized by one piece of equipment, but a unit for realizing each apparatus is not limited thereto. That is, each apparatus may have a physically separated configuration or a logically separated configuration. Note that, the same components are denoted by the same reference numerals, and the descriptions thereof will not be repeated.

First Example Embodiment

Figure 2:
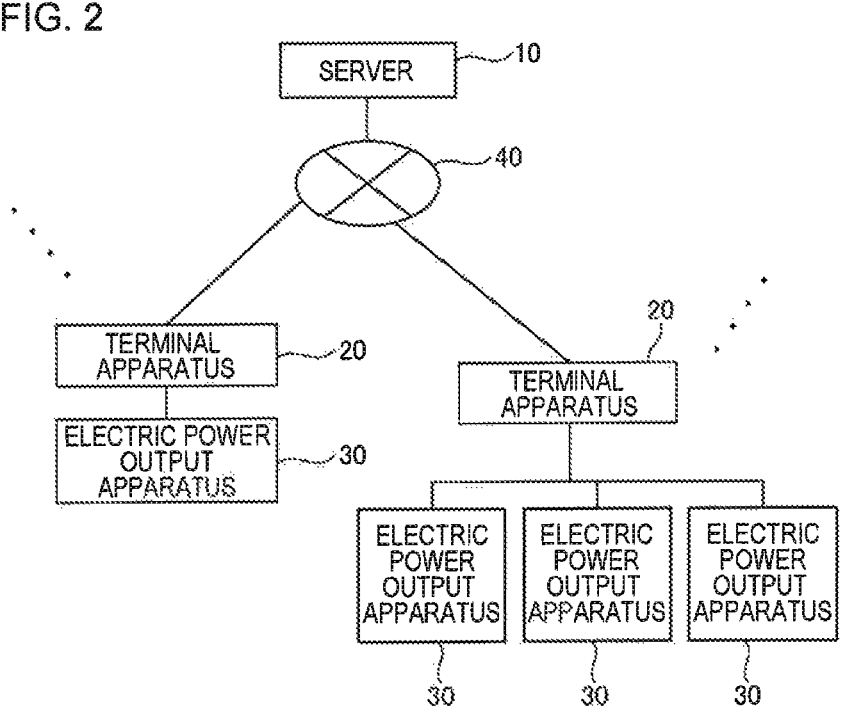
FIG. 2 is a diagram for describing an overall picture of a management system according to the example embodiment.

First, with reference to FIG. 2, the overall picture of the management system according to the example embodiment will be described. As illustrated in the figure, the management system includes a server (control apparatus) 10, a terminal apparatus 20, and an electric power output apparatus 30. As illustrated in the figure, the server 10 and the terminal apparatus 20 are connected to a network 40 such as the Internet, so that information may be mutually transmitted and received. The terminal apparatus 20 and the electric power output apparatus 30 are connected through wired and/or wireless connection, and it is possible to transmit and receive information according to any communication standard.

The electric power output apparatus 30 has a function of outputting electric power to supply electric power to the electric power distribution network. The electric power output apparatus 30 may have a function of receiving electric power supply from the electric power distribution network to accumulate energy. For example, the electric power output apparatus 30 corresponds to a storage battery, an electric power generation apparatus (for example, an electric power generation apparatus that generates electric power using natural energy), and the like, but is not limited thereto. Each electric power output apparatus 30 is managed by, for example, an electric power generation business operator or a general user.

The terminal apparatus 20 has a function of controlling the operation of the electric power output apparatus 30, collecting information from the electric power output apparatus 30, and transmitting the information to the server 10. As illustrated in the figure, one terminal apparatus 20 may be installed corresponding to one electric power output apparatus 30, or one terminal apparatus 20 may be installed corresponding to plural electric power output apparatuses 30. The terminal apparatus 20 and the electric power output apparatus 30 may be physically integrated or be configured separately.

The server 10 is managed by an electric power company. The server 10 may control the operation of the electric power output apparatus 30 through the terminal apparatus 20 and execute a service such as demand response. For example, the server 10 makes, to the terminal apparatus 20, an output request specifying the output value (W) (a request for electric power supply to the electric power distribution network). The terminal apparatus 20 controls a subordinate electric power output apparatus 30 such that the electric power output apparatus performs output according to the output request.

Figure 3:
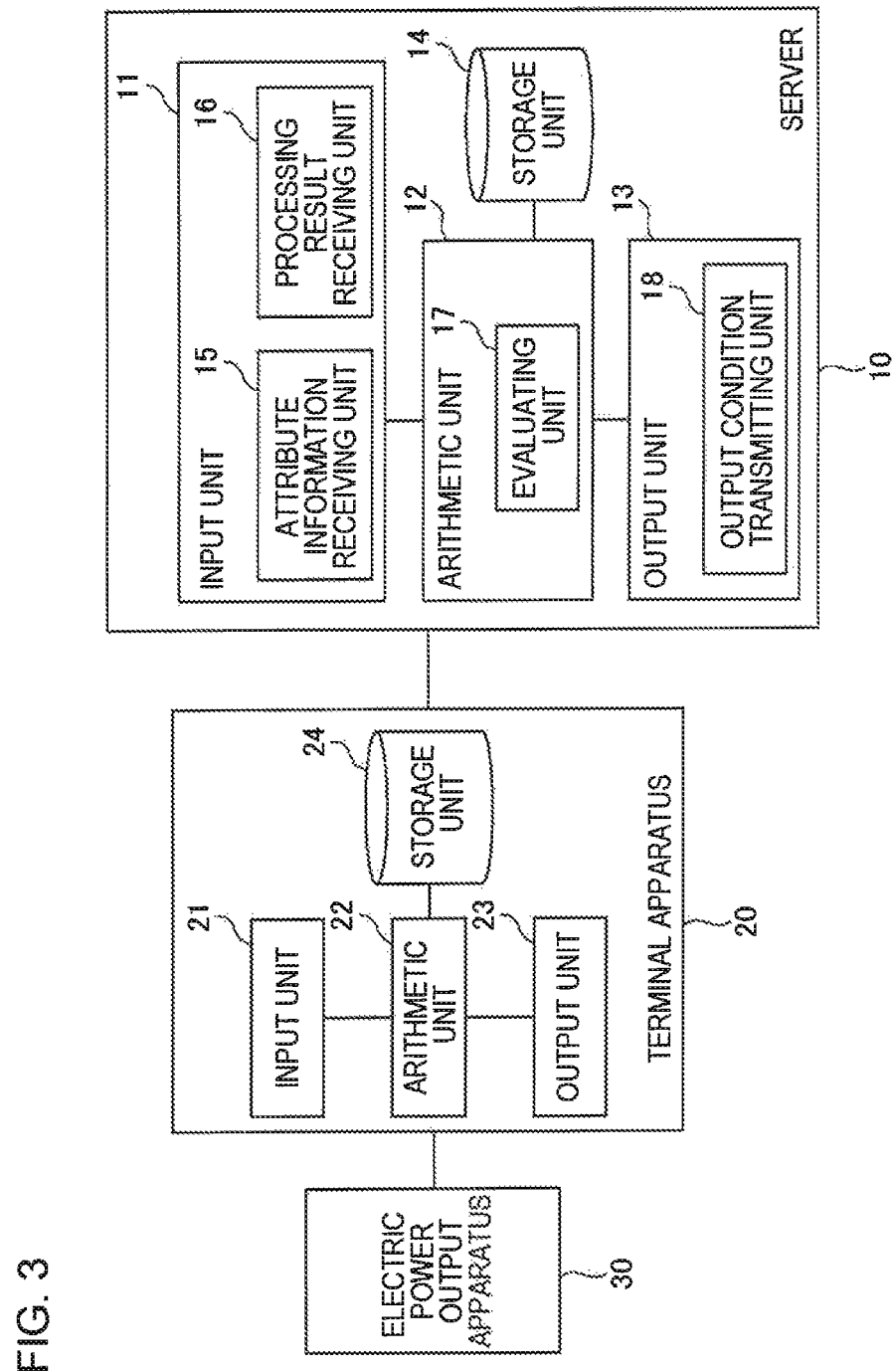
FIG. 3 is an example of a functional block diagram of a management system according to the example embodiment.

The management system according to the example embodiment has a unit which evaluates the electric power output performance of the electric power output apparatus 30. In the server 10 and the terminal apparatus 20, it is possible to realize output conforming to the output request from the server 10 by controlling the operation of each electric power output apparatus 30 on the basis of the evaluation result. Hereinafter, the configuration of each apparatus will be described in detail, FIG. 3 illustrates an example of a functional block diagram of the management system according to the example embodiment. As illustrated, the terminal apparatus 20 includes an input unit 21, an arithmetic unit 22, an output unit 23, and a storage unit 24. The input unit 21 receives an input of data. The arithmetic unit 22 performs predetermined arithmetic processing. The output unit 23 outputs data. The storage unit 24 stores data. Explanation of specific processing performed by each unit of the terminal apparatus 20 is appropriately performed at the time of describing the configuration of the following server 10.

The server 10 includes an input unit 11, an arithmetic unit 12, an output unit 13, and a storage unit 14, The input unit 11 receives an input of data. The arithmetic unit 12 performs predetermined arithmetic processing. The output unit 13 outputs data. The storage unit 14 stores data. The input unit 11 includes an attribute information receiving unit 15 and a processing result receiving unit 16. The arithmetic unit 12 includes an evaluating unit 17. The output unit 13 has an output condition transmitting unit 18.

The attribute information receiving unit 15 receives, from the electric power output apparatus 30, attribute information of the own apparatus (electric power output apparatus 30). The attribute information receiving unit 15 receives the attribute information from the electric power output apparatus 30 through the terminal apparatus 20. The attribute information includes, for example, a manufacturer (brand-name), a model name, date of manufacture, and the like. Such attribute information is registered in advance on each electric power output apparatus 30. The electric power output apparatus 30 transmits the attribute information to the terminal apparatus 20 at a predetermined timing. When the terminal apparatus 20 receives the attribute information from the electric power output apparatus 30 (input unit 21), the terminal apparatus 20 transmits the received attribute information to the server 10 (output unit 23).

For example, in a case where the electric power output apparatus 30 is newly connected to the electric power distribution network, the electric power output apparatus 30 and any terminal apparatus 20 may be communicated to each other as preparation for the Pew connection. The electric power output apparatus 30 is set as an apparatus to be controlled by the terminal apparatus 20. Such preparation allows the terminal apparatus 20 to control an operation of the electric power output apparatus 30. The operation to be controlled is an operation of outputting electric power from a power conditioner provided in the electric power output apparatus 30 to the electric power distribution network, or taking electric power from the electric power distribution network into the power conditioner, and so on.

The timing of transmitting the attribute information from the electric power output apparatus 30 to the terminal apparatus 20 depends on a matter of design. For example, after the completion of setting the electric power output apparatus 30 as the apparatus to be controlled, the electric power output apparatus 30 may transmit the attribute information to the terminal apparatus 20 at an arbitrary timing. For example, the electric power output apparatus 30 may transmit the attribute information of the own apparatus to the terminal apparatus 20 according to a predetermined operation on the terminal apparatus 20 or the electric power output apparatus 30 by an operator. Besides, according to the completion of setting the electric power output apparatus 30 as the apparatus to be controlled, the terminal apparatus 20 may make a request for attribute information to the electric power output apparatus 30 at a predetermined timing after the completion. Then, the electric power output apparatus 30 may transmit the attribute information of the own apparatus to the terminal apparatus 20 in response to the request.

The timing of transmission of the attribute information is not limited to when the electric power output apparatus 30 is newly connected to the electric power distribution network. For example, after being connected to the electric power distribution network, the electric power output apparatus 30 may transmit the attribute information of the own apparatus to the terminal apparatus 20 at a preset predetermined timing, periodically (for example, once a year, once every three months, and the like).

The output condition transmitting unit 18 transmits the output condition determined in accordance with the attribute information received by the attribute information receiving unit 15 to the electric power output apparatus 30 through the terminal apparatus 20.

In the output condition, for example, a value (specified value) of at least one item of active electric power, reactive electric power, a voltage, a frequency, and a change amount (ramp) of electric power during a predetermined time is specified. As details thereof will be described below, the electric power output apparatus 30 performs an output operation (test operation) of electric power according to the output condition. Then, the output performance of the electric power output apparatus 30 is evaluated on the basis of the output condition and the output result of the electric power output apparatus 30 according to the output condition.

In the example embodiment, the storage unit 14 stores plural output conditions in advance. The arithmetic unit 12 searches the storage unit 14 using the attribute information transmitted from the terminal apparatus 20 as a key, and retrieves, from among the plural output conditions previously stored in the storage unit 14, an output condition in accordance with the received attribute information. In this manner, the output condition transmitting unit 18 transmits, through the terminal apparatus 20, the output condition retrieved by the arithmetic unit 12 to the electric power output apparatus 30.

Here, FIG. 4 and FIG. 5 schematically illustrate an example of information stored in the storage unit 14. FIG. 4 illustrates output condition information on which details of plural output conditions are registered. In association with an output condition ID (identifier), values (specified values) of active electric power, reactive electric power, a voltage, a frequency, and a ramp are associated with one another.

FIG. 5 indicates information where model names of electric power output apparatuses 30 and IDs of output conditions applied to each model name are associated to each other. Note that, one output condition may be applied to only the one electric power output apparatus 30 or may be applied to plural electric power output apparatuses 30. The output condition, for example, may be in accordance with the capability of the power conditioner of the electric power output apparatus 30. In such a case, the same output condition is applied to the plural electric power output apparatuses 30 including a power conditioner with the same or an equivalent capability.

Returning to FIG. 3, the processing result receiving unit 16 receives a processing result obtained by performing predetermined processing on output waveform data in a case where the electric power output apparatus 30 outputs electric power according to the output condition. The processing result receiving unit 16 receives the processing result from the terminal apparatus 20.

The electric power output apparatus 30 that received the output condition performs an output operation (test operation) of electric power according to the output condition. That is, the electric power output apparatus 30 performs an output operation so as to output electric power at the specified value of one item or each of plural items defined in the output condition.

Then, the terminal apparatus 20 receives the output waveform data at the time when the electric power output apparatus 30 outputs electric power according to the output condition (input unit 21). Specifically, the terminal apparatus 20 receives alternating current waveform data (for example, current waveform data) output from the power conditioner of the electric power output apparatus 30. For example, the terminal apparatus 20 receives the alternating current waveform data from a measuring sensor which is installed at any position at which the alternating current waveform data can be measured. Note that, the terminal apparatus 20 and the power conditioner, which is connected to the electric power output apparatus 30, are connected to the same electric power line. For this reason, the terminal apparatus 20 may receive an output waveform (alternating current waveform data) output from the power conditioner.

Thereafter, the terminal apparatus 20 performs predetermined arithmetic processing on the received alternating current waveform data (arithmetic unit 22). As a result of the arithmetic processing, values (measured values) such as active electric power, reactive electric power, a voltage, a frequency, and a ramp are obtained. The terminal apparatus 20 transmits these values as a processing result to the server 10 (output unit 23).

The evaluating unit 17 evaluates the electric power output performance of the electric power output apparatus 30 on the basis of the processing result and the output condition. The evaluating unit 17 calculates reliability of the electric power output performance of the electric power output apparatus 30 on the basis of the processing result and the output condition. That is, reliability is evaluated on the basis of the indication of whether or not output is performed at the specified value, or how much there is a deviation from the specified value, and the like. Hereinafter, an example of the evaluation method will be described.

For example, the server 10 may store reference information indicating, for each output condition, the standard range within which the value (measured value) of each item falls in a case where a normal (not deteriorated, failed, and the like) electric power output apparatus 30 performs an output operation of electric power according to the output condition (storage unit 14). FIG. 6 schematically illustrates an example of reference information. In the figure, in association with one output condition, there is defined an allowable range of the output result of one electric power output apparatus or each of plural electric power output apparatuses 30 to which the output condition is applied. Reference information as illustrated in FIG. 6 is prepared for each output condition.

The evaluating unit 17 checks whether the measured value of each item indicated by the processing result falls within the allowable range corresponding to the output condition and the electric power output apparatus 30 (the model name of the electric power output apparatus 30) (see FIG. 6). In a case where the measured value falls within the allowable range, the evaluating unit 17 decides that the electric power output apparatus 30 can output at the specified value. In contrast, in a case where the measured value does not fall within the allowable range, the evaluating unit 17 decides that the electric power output apparatus 30 cannot output at the specified value.

Here, as the case where the measured value falls within the allowable range, there are defined a case where the measured values of all of the plural items fall within allowable ranges, or a case where the measured values of a predetermined number or more of plural items, or a predetermined proportion or more of plural items fall within allowable ranges, and the like.

In a case where it is decided that an output cannot be performed at the specified value, the evaluating unit 17 may calculate an indication (reliability) of how much there is a deviation from the specified value. For example, the evaluating unit 17 may calculate a reliability (=(measured value)/(specified value)) for each item. Then, the evaluating unit 17 also may use a statistical value (for example, an average value, a maximum value, a minimum value, the most frequent value, a median value, and the like) of reliabilities calculated for each of plural items as the reliability of the electric power output apparatus 30. For example, the statistical value of reliabilities of at least two items of active electric power, reactive electric power, the voltage and the ramp may be used as the reliability of the electric power output apparatus 30. This indicates that, in a case where a specified value is given to the electric power output apparatus 30, output may deviate from the specified value to the extent of the product of the specified value and the reliability (a value decreases).

It should be noted that, in a case where the reliability is calculated by a formula of reliability=(measured value)/(specified value), the reliability of the electric power output apparatus 30 decided to be able to output at the specified value, may be set to "1".

As a modification example of evaluation processing by the evaluating unit 17, the evaluating unit 17 does not perform a "process of checking whether the measured value of each item indicated by the processing result falls within the allowable range corresponding to the output condition and the electric power output apparatus 30" as described above, and may calculate the reliability by the above-described method using the formula of reliability=(measured value)/(specified value) for all the electric power output apparatuses 30.

The output unit 13 transmits an evaluation result (reliability) by the evaluating unit 17 to the terminal apparatus 20. This makes it possible for the terminal apparatus 20 to grasp the output performance of the electric power output apparatus 30 to be controlled. The storage unit 24 of the terminal apparatus 20 may store the output performance of the electric power output apparatus 30 to be controlled. Note that, the evaluation result by the evaluating unit 17 may be stored in the storage unit 14 of the server 10.

As another example, the output unit 13 may not transmit the evaluation result by the evaluating unit 17 to the terminal apparatus 20. In this case, the evaluation result by the evaluating unit 17 is stored in the storage unit 14 of the server 10.

It should be noted that, in a case where, after the electric power output apparatus 30 is connected to the electric power distribution network, the electric power output apparatus 30 transmits the attribute information of the own apparatus to the terminal apparatus 20 at a preset predetermined timing, periodically (for example, once a year, once every three months, and the like), the server 10 may periodically evaluate the electric power output performance of the electric power output apparatus 30 (calculate the reliability) in response to the reception of the attribute information. This makes it possible for the server 10 or the terminal apparatus 20 to detect degradation of the electric power output performance due to deterioration over time, or degradation of the output performance due to some troubles such as failure.

In an example where, after the connection to the electric power distribution network, the evaluation of the electric power output performance is repeatedly performed, the storage unit 14 may accumulate past evaluation results of each electric power output apparatus 30 in association with evaluation timings. Then, the evaluating unit 17 may evaluate the electric power output performance of the electric power output apparatus 30 by using past evaluation results.

For example, machine learning is performed using training data associating an elapsed time from an arbitrary timing (for example, the first evaluation timing) with an evaluation result (reliability) at that timing, and a prediction model of the evaluation result at an arbitrary timing may be generated. Then, the evaluating unit 17 may estimate the evaluation result at the next evaluation timing by using the prediction model. Thereafter, the evaluating unit 17 may calculate the current evaluation result of the electric power output apparatus 30 on the basis of the estimated evaluation result of the next evaluation timing and an evaluation result based on the current newly received processing result. For example, the average value of these two evaluation results may be used as the evaluation result.

Next, an example of a process flow of the management system according to the example embodiment will be described with reference to the sequence diagram of FIG. 7.

First, the electric power output apparatus 30 transmits the attribute information of the own apparatus to a predetermined terminal apparatus 20 at an arbitrary timing (S101). The terminal apparatus 20 transmits the received attribute information to the server 10 (S102).

In a case where the server 10 receives the attribute information, the server 10 determines a predetermined output condition on the basis of the content of the attribute information (S103). For example, on the basis of the information illustrated in FIGS. 4 and 5, an output condition corresponding to the model name of an electric power output apparatus 30 included in the received attribute information is determined. In the output condition, values of at least one item of active electric power, reactive electric power, the voltage, the frequency, and the ramp are specified.

Thereafter, the server 10 transmits the determined output condition to the terminal apparatus 20 (S104). Then, the terminal apparatus 20 transmits the received output condition to the electric power output apparatus 30 (S105).

Thereafter, the electric power output apparatus 30 performs an output operation (test operation) of electric power according to the received output condition (S106). The terminal apparatus 20 measures an output of the test operation of electric power in S106 and obtains output waveform data (alternating current waveform data) (S107). Subsequently, the terminal apparatus 20 performs predetermined processing on the received output waveform data to calculate a value of a predetermined item (S108). Herein, measured values of at least one item of active electric power, reactive electric power, a voltage, a frequency, and a ramp are calculated.

Thereafter, the terminal apparatus 20 transmits the calculated values as a processing result to the server 10 (S109). The server 10 evaluates the electric power output performance of the electric power output apparatus 30 on the basis of the processing result which is received (S110). Specifically; the server 10 calculates the reliability of the electric power output apparatus 30 by the above-described method. Although not illustrated, the server 10 may store the calculated reliability in association with the electric power output apparatus 30 (storage unit 14).

Thereafter, the server 10 transmits the evaluation result (reliability) to the terminal apparatus 20 (S111). The terminal apparatus 20 stores the evaluation result (reliability) in association with the electric power output apparatus 30 (S112) (storage unit 24).

Although not illustrated, after receiving the evaluation result (reliability), the terminal apparatus 20 may calculate the electric power output performance of one or plural electric power output apparatuses 30 as a whole to be controlled and report the electric power output performance to the server 10. That is, in a case where the terminal apparatus 20 controls the plural electric power output apparatuses 30, the terminal apparatus 20 may calculate the reliability of the plural electric power output apparatuses 30 as a whole. The electric power output performance of one electric power output apparatus 30 to be controlled or the electric power output performance of the plural electric power output apparatuses 30 as a whole to be controlled may be considered as an electric power output performance which the terminal apparatus 20 can process. In this case, the server 10 stores the received information in association with each terminal apparatus 20 (storage unit 14).

For example, the terminal apparatus 20 may calculate a total of rated output (W), a total of capacities, and the like of one or plural electric power Output apparatuses 30 to be controlled and report the total to the server 10. Note that, the total of a rated output (W) is obtained as a total of a "rated output (W) of an electric power output apparatus 30 decided to be able to output at the specified value" and a "value obtained by multiplying a rated output (W) of an electric power output apparatus 30 decided to be unable to output at the specified value by the reliability (=(measured value)/(specified value))".

Next, another example of the process flow of the management system according to the example embodiment will be described with reference to the sequence diagram of FIG. 8. This example is different from the example of FIG. 7 in that this example includes neither a "process of transmitting the reliability from the server 10 to the terminal apparatus 20 (S111)" nor a "process of storing the reliability in the terminal apparatus 20 (S112)" presented in the example of FIG. 7, but this example includes a "process of storing the reliability in the server 10 (S511)". Others are similar to those of the example in FIG. 7.

Figure 7:
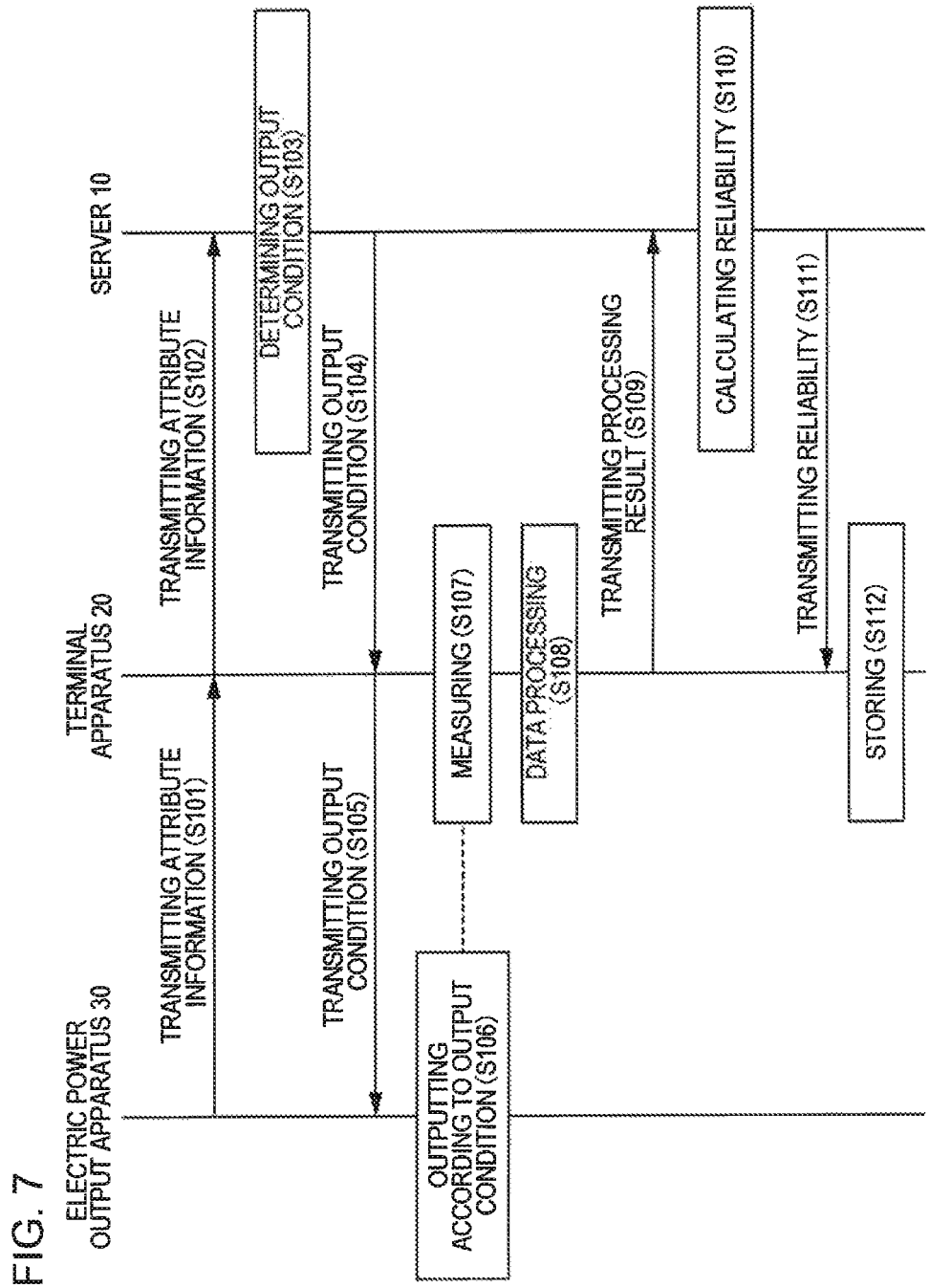
FIG. 7 is a sequence diagram illustrating an example of a processing flow of a management system according to the example embodiment.
Figure 8:
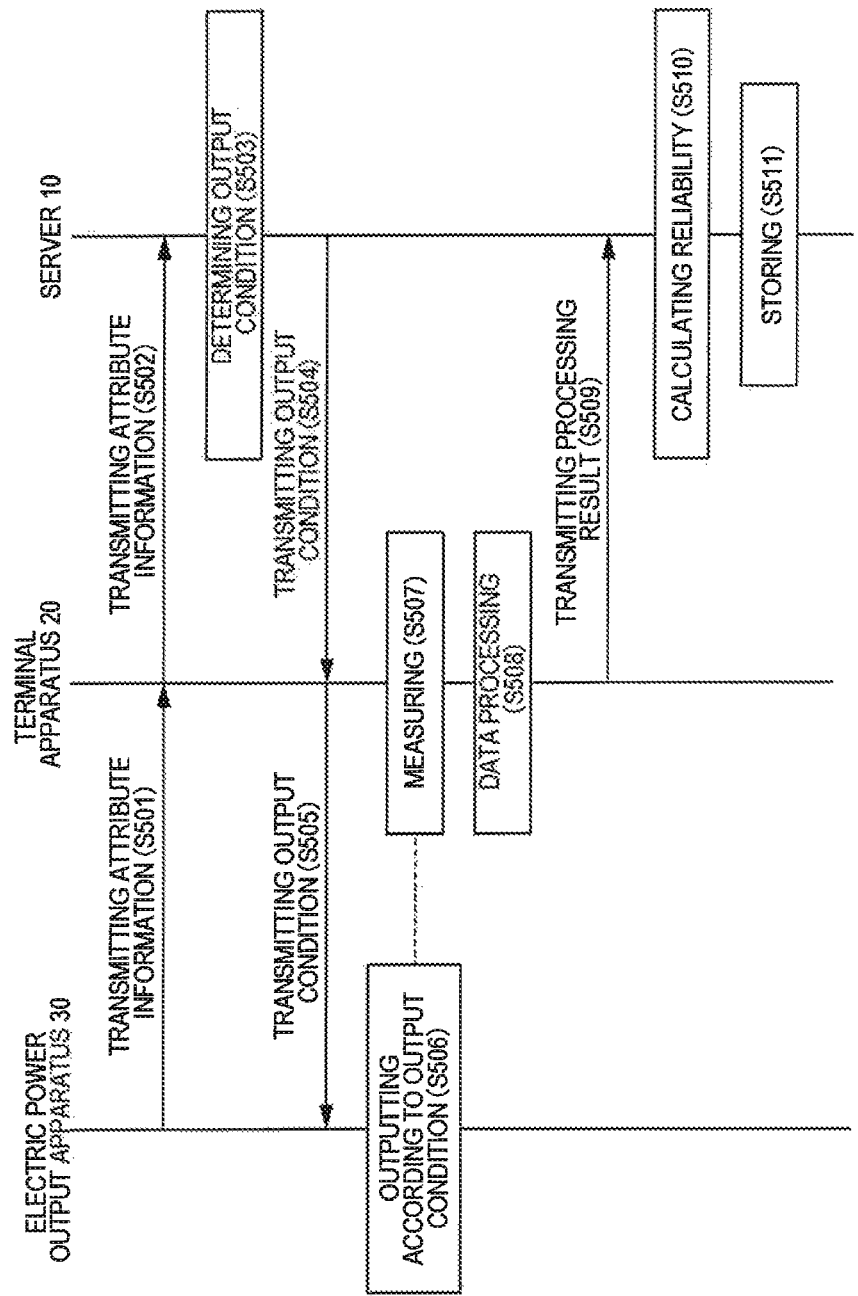
FIG. 8 is a sequence diagram illustrating an example of a processing flow of the management system according to the example embodiment.

In the example of FIG. 7, the terminal apparatus 20 manages (stores) the reliability of one or plural electric power output apparatuses 30 to be controlled. In the case of the example of FIG. 8, the server 10 manages (stores) the reliability of one or plural electric power output apparatuses 30 to be controlled. Note that, in the example of FIG. 7, in addition to the terminal apparatus 20, the server 10 also may manage (store) the reliability of the electric power output apparatus 30.

According to the example embodiment described above, the server 10 and the terminal apparatus 20 may evaluate and grasp the electric power output performance (reliability) of the electric power output apparatus 30 connected to the electric power distribution network. Since a service such as demand response using the electric power output apparatus 30 is performed on the basis of this reliability, the quality of the service can be maintained.

It should be noted that, the above-described formula of reliability=(measured value)/(specified value) is merely an example, and another formula conforming to this may be adopted.

Herein, there has been described an example in which the terminal apparatus 20 performs predetermined processing on the output waveform data to calculate values (measured values) such as active electric power, reactive electric power, a voltage, a frequency, a ramp, and transmits these values as a processing result to the server 10. As a modification example, the terminal apparatus 20 may perform AD conversion (predetermined processing) on the output waveform data and transmit the results (digital waveform data) to the server 10. Then, the server 10 may analyze the received digital waveform data to calculate values (measured values) such as active electric power, reactive electric power, a voltage, a frequency, a ramp. The premise is the same as in all of the following example embodiments.

Second Example Embodiment

The management system according to the example embodiment is different from that of the first example embodiment in that the terminal apparatus 20 evaluates the electric power output performance of the electric power output apparatus 30. The overall picture of the management system according to the example embodiment is similar to that of the first example embodiment.

Figure 9:
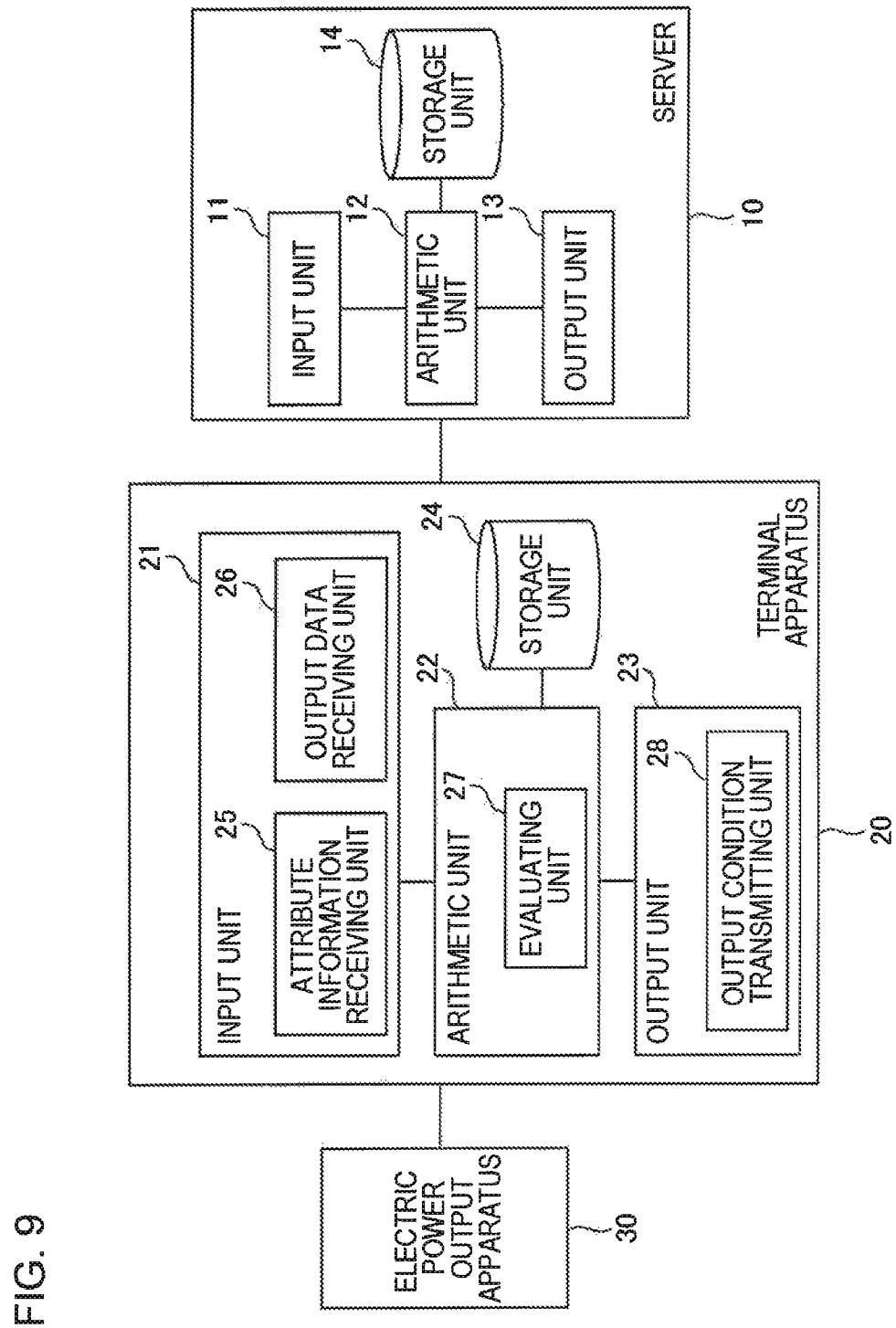
FIG. 9 is an example of a functional block diagram of a management system according to the example embodiment.

FIG. 9 illustrates an example of a functional block diagram of the management system according to the example embodiment. As illustrated, the server 10 includes an input unit 11, an arithmetic unit 12, an output unit 13, and a storage unit 14. The input unit 11 receives an input of data. The arithmetic unit 12 performs predetermined arithmetic processing. The output unit 13 outputs data. The storage unit 14 stores data. Explanation of specific processing performed by each unit of the server 10 is appropriately performed at the time of describing the configuration of the following terminal apparatus 20.

The terminal apparatus 20 includes an input unit 21, an arithmetic unit 22, an output unit 23, and a storage unit 24. The input unit 21 receives an input of data. The arithmetic unit 22 performs predetermined arithmetic processing. The output unit 23 outputs data. The storage unit 24 stores data. The input unit 21 includes an attribute information receiving unit 25 and an output data receiving unit 26. The arithmetic unit 22 has an evaluating unit 27. The output unit 23 includes an output condition transmitting unit 28.

The attribute information receiving unit 25 receives, from an electric power output apparatus 30, the attribute information of the own apparatus (the electric power output apparatus 30). The configuration in which the terminal apparatus 20 receives the attribute information from the electric power output apparatus 30 is similar to that of the first example embodiment.

The terminal apparatus 20 transmits the attribute information received from the electric power output apparatus 30 to the server 10. Then, the server 10 determines an output condition in accordance with the attribute information, and transmits the output condition to the terminal apparatus 20. Then, the terminal apparatus 20 receives the output condition transmitted from the server 10. These processes are similar to those of the first example embodiment.

The output condition transmitting unit 28 transmits the output condition determined in accordance with the attribute information received by the attribute information receiving unit 25 to the electric power output apparatus 30 that has transmitted the attribute information.

The output data receiving unit 26 receives output waveform data at the time when the electric power output apparatus 30 performs an output operation (test operation) of electric power according to the output condition. Specifically, the output data receiving unit 26 receives alternating current waveform data output from the power conditioner of the electric power output apparatus 30. For example, the output data receiving unit 26 receives the waveform data from a measuring sensor installed at any position at which the alternating current waveform data can be measured.

The evaluating unit 27 evaluates the electric power output performance of the electric power output apparatus 30 (calculates reliability) on the basis of the output waveform data received by the output data receiving unit 26 and the output condition.

First, the evaluating unit 27 performs predetermined processing on the output waveform data to calculate values (measured values) such as active electric power, reactive electric power, a voltage, a frequency, a ramp. Then, the output unit 23 transmits these values as a processing result to the server 10.

The arithmetic unit 12 of the server 10 evaluates whether or not the electric power output apparatus 30 can output at the specified value on the basis of the processing result and the output condition. An example of the evaluation method is the same as that described in the first example embodiment.

Then, the output unit 13 of the server 10 transmits an evaluation result to the terminal apparatus 20. In a case where the evaluation result received from the server 10 shows that the electric power output apparatus 30 can output at the specified value, the evaluating unit 27 determines the reliability of the electric power output apparatus 30 to "1(=100%)".

In contrast, in the case where the evaluation result received from the server 10 indicates that the electric power output apparatus 30 cannot output at the specified value, the evaluating unit 27 calculates an indication (reliability) of how much there is a deviation from the specified value. For example, the evaluating unit 27 calculates the reliability on the basis of the formula of reliability=(measured value)/(specified value).

Note that, as a modification example of the evaluation processing, for all the electric power output apparatuses 30, the evaluating unit 27 may calculate the reliability by the above-described method using the formula of reliability=(measured value)/(specified value). In this case, "transmitting the processing result from the terminal apparatus 20 to the server 10", "evaluating whether or not the electric power output apparatus 30 can output at the specified value, by the server 10" and "transmitting a processing result from the server 10 to the terminal apparatus 20" are unnecessary.

Figure 10:
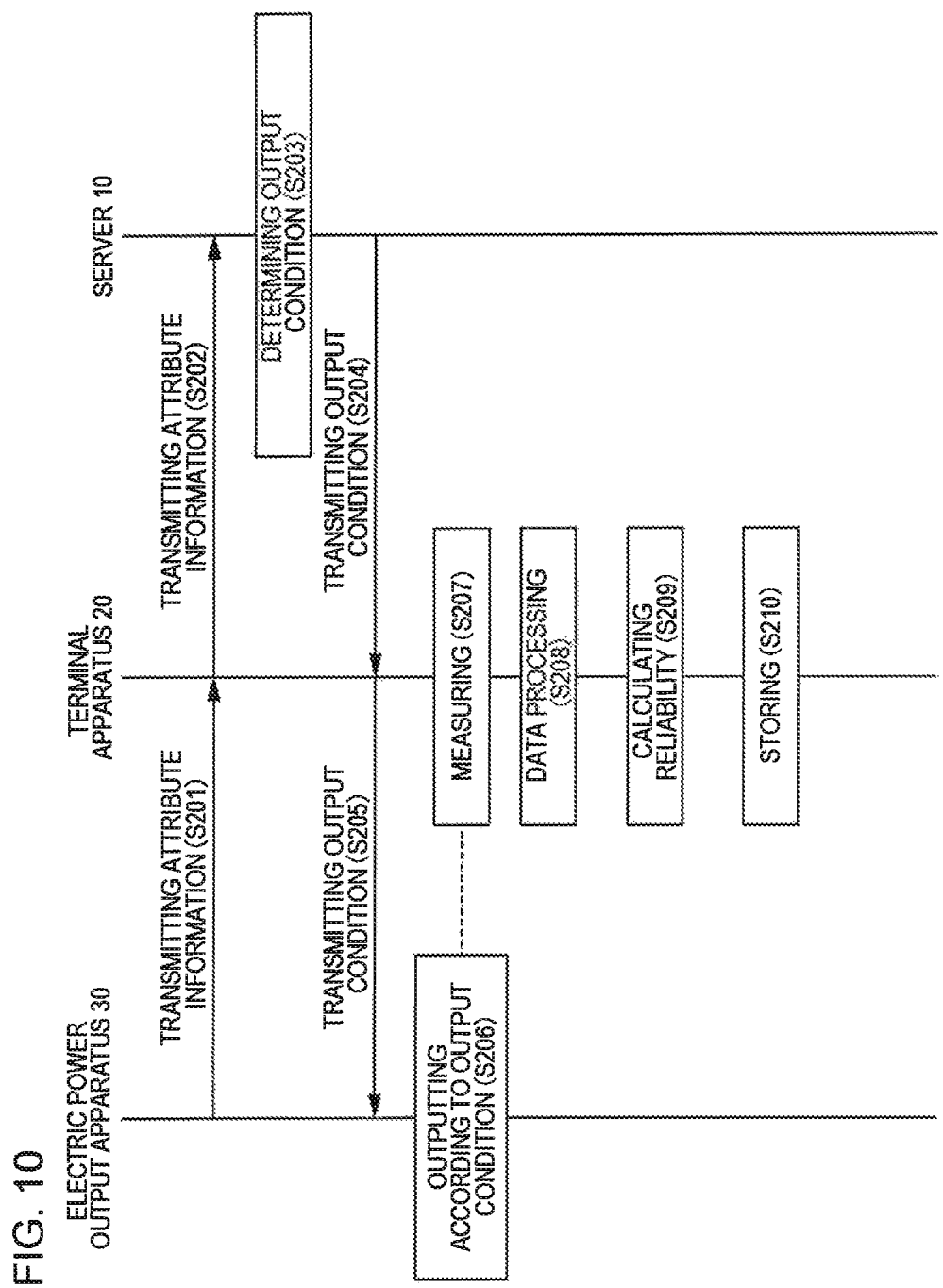
FIG. 10 is a sequence diagram illustrating an example of a processing flow of a management system according to the example embodiment.

Next, an example of a processing flow of the management system according to the example embodiment will be described with reference to the sequence diagram of FIG. 10. Herein, an example of the process flow of the modification example will be described.

First, the electric power output apparatus 30 transmits attribute information of the own apparatus to a predetermined terminal apparatus 20 at an arbitrary timing (S201). The terminal apparatus 20 transmits the received attribute information to the server 10 (S202).

When the server 10 receives the attribute information, the server 10 determines a predetermined output condition on the basis of the content of the attribute information (S203). For example, on the basis of the information illustrated in FIGS. 4 and 5, an output condition corresponding to the model name of an electric power output apparatus 30 included in the received attribute information is determined. In the output condition, values of at least one item of active electric power, reactive electric power, the voltage, the frequency, and the ramp are specified.

Thereafter, the server 10 transmits the determined output condition to the terminal apparatus 20 (S204). Then, the terminal apparatus 20 transmits the received output condition to the electric power output apparatus 30 (S205).

Thereafter, the electric power output apparatus 30 performs an electric power output operation according to the received output condition (S206). The terminal apparatus 20 measures an output during the electric power output operation in S206 and obtains output waveform data (alternating current waveform data) (S207). Subsequently, the terminal apparatus 20 performs predetermined processing on the received output waveform data to calculate a value of a predetermined item (S208). Herein, measured values of at least one item of active electric power, reactive electric power, a voltage, a frequency, and a ramp are calculated.

Thereafter, the terminal apparatus 20 evaluates the electric power output performance (reliability) of the electric power output apparatus 30 on the basis of the calculated value and the output condition (S209). Specifically, the terminal apparatus 20 calculates the reliability using the formula of reliability=(measured value)/(specified value). Thereafter, the terminal apparatus 20 stores the reliability in association with the electric power output apparatus 30 (S210).

Note that, although not illustrated, after a process S209, the terminal apparatus 20 may calculate the electric power output performance of one or plural electric power output apparatuses 30 to be controlled and report the electric power output performance to the server 10. That is, in a case where the terminal apparatus 20 controls the plural electric power output apparatuses 30, the terminal apparatus 20 may calculate the reliability of the plural electric power output apparatuses 30 as a whole. The electric power output performance of one electric power output apparatus 30 to be controlled or the electric power output, performance of the plural electric power output apparatuses 30 as a whole to be controlled may be considered as an electric power output performance which the terminal apparatus 20 can process. In this case, the server 10 stores the received information in association with each terminal apparatus 20 (storage unit 14). The processing is the same as described in the first example embodiment.

Although not illustrated, the terminal apparatus 20 may transmit the reliability in association with the electric power output apparatus 30 to the server 10. Then, the server 10 may store the reliability in association with the electric power output apparatus 30. In this case, there may or may not be storage processing of S210.

According to the example embodiment described above, advantageous effects similar to those of the first example embodiment can be realized. According to the example embodiment, the terminal apparatus 20 calculates the reliability of the electric power output apparatus 30. For this reason, it is possible to reduce any inconvenience that loads concentrate on the server 10.

Third Example Embodiment

The example embodiment is based on a premise that the reliability of the electric power output apparatus 30 is stored in the terminal apparatus 20 by the processing described in the first and second example embodiments. On the basis of the premise, output control processing using the reliability will be described.

An example of a functional block diagram of the management system according to the example embodiment is illustrated in FIG. 3 or 9. The example embodiment is different from the first and second example embodiments in that the arithmetic unit 22 of the terminal apparatus 20 includes an allocating unit (not illustrated). Hereinafter, there will be described points different from the first and second example embodiments.

The input unit 21 receives an output request of electric power from the server 10. In the output request, output electric power M(W), an output time (hours, minutes, and the like), a time period for output (for example, Feb. 10, 2016, from 15:00 to 16:00 time), and the like are defined.

The arithmetic unit (allocating unit) 22 determines, from among plural electric power output apparatuses 30 to be controlled, an electric power output apparatus 30 to output electric power in response to the output request. The arithmetic unit 22 determines control contents (output electric power (W), a time period for output, and the like) for each of electric power output apparatuses 30 determined to output electric power.

The arithmetic unit 22 determines an electric power output apparatus 30 having higher reliability, as the electric power output apparatus 30 to be caused to preferentially output electric power (to which a control signal is transmitted). That is, the arithmetic unit 22 determines the electric power output apparatus 30 having relatively higher reliability compared to the other electric power output apparatuses 30, as an electric power output apparatus 30 to which a control signal is transmitted. "The reliability is relatively higher compared to the other electric power output apparatuses 30" may mean that the reliability is higher than a statistical value (for example, an average value, and a median value) of reliabilities of plural registered electric power output apparatuses 30.

Note that, the input unit 21 may receive state information (for example, an SOC, and the like) from each of the plural electric power output apparatuses 30 to be controlled, Besides, the input unit 21 may receive controllable information corresponding to each of the plural electric power output apparatuses 30 to be controlled. The controllable information defines the maximum controllable electric power (W), the maximum controllable electric power energy (Wh), a controllable time period, and the like on the side of the terminal apparatus 20. Note that, in the case where the terminal apparatus 20 controls plural electric power output apparatuses 30, the maximum controllable electric power (W) on the side of the terminal apparatus 20 may be a total of pieces of maximum electric power (W) of the plural electric power output apparatuses 30. In a case where the terminal apparatus 20 controls plural electric power output apparatuses 30, the maximum controllable electric power energy (Wh) on the side of the terminal apparatus 20 may be a total of pieces of maximum electric power energy (Wh) of the plural electric power output apparatuses 30. The controllable information is determined by an administrator of each of the electric power output apparatuses 30 and transmitted to the terminal apparatus 20 and the corresponding electric power output apparatus 30.

Then, in addition to the reliability of each electric power output apparatus 30, the arithmetic unit 22 may perform the determination processing by using at least one of the state information and the controllable information of each electric power output apparatus 30. Also, in this case, the arithmetic unit 22 determines the electric power output apparatus 30 having higher reliability, as the electric power output apparatus 30 to be caused to preferentially output electric power (to which a control signal is transmitted).

Here, a specific example of the determination processing will be described. For example, it is assumed that there are a first to third electric power output apparatuses 30 as apparatuses to be controlled by a certain terminal apparatus 20. Details of each are as follows and are assumed to be given to the terminal apparatus 20.

"First Electric Power Output Apparatus 30"
Reliability: 0.8
Maximum controllable electric power: 2 kW
Maximum controllable electric power energy: 4 kWh
Controllable time period: Any time
Current free capacity: 5 kWh
"Second Electric Power Output Apparatus 30"
Reliability: 1.0
Maximum controllable electric power: 2 kW
Maximum controllable electric power energy: 2.5 kWh
Controllable time period: Any time
Current free capacity: 3 kWh
"Third Electric Power Output Apparatus 30"
Reliability: 0.9
Maximum controllable electric power: 3 kW
Maximum controllable electric power energy: 3 kWh
Controllable time period: Any time
Current free capacity: 4 kWh Then, it is assumed that there is an output request of "3 kW, 1 hour (Feb. 10, 2016, from 16:00 to 17:00 time)", to the terminal apparatus 20.

In this case, the arithmetic unit 22 causes the second electric power output apparatus 30 having the highest reliability to preferentially output electric power. Herein, there is determined control contents such that the second electric power output apparatus 30 is fully utilized so as to output at "2 kW, 1 hour (Feb. 10, 2016, from 16:00 to 17:00 time)". Then, there is determined control contents such that the third electric power output apparatus 30 having the next higher reliability outputs at the remainder, that is, "1 kW, 1 hour (Feb. 10, 2016, from 16:00 to 17:00 time)". In this case, it is unnecessary to control the first electric power output apparatus 30 having the lowest reliability and the first electric power output apparatus 30 is caused not to output.

It should be noted that, herein, although an example of full utilization in descending order of reliability was described, this allocation method is merely an example, and is not limited thereto.

For example, the proportion of a load according to the ranking of the reliability may be determined. In this case, as an electric power output apparatus 30 has high reliability, the proportion of a load thereof is increased. As an example, the proportion of a load of each electric power output apparatus 30 may be determined according to the proportion of reliability (for example, the output is proportionally divided by the rates of reliability). In the case of the example, for example, the second electric power output apparatus 30 is caused to output 80% of 3 kW, the third electric power output apparatus 30 is caused to output 15% of 3 kW, and the first electric power output apparatus 30 is caused to output 5% of 3 kW.

It should be noted that, in this example, depending on a current state (an SOC, and the like) of each electric power output apparatus 30 or controllable contents (for example, the maximum controllable electric power (W), the maximum controllable electric power energy (Wh), and the like), there is a possibility that each electric power output apparatus 30 may not process an amount allocated to each electric power output apparatus 30. For example, in the case of the example, the second electric power output apparatus 30 is caused to output at 2.4 kW (=3 kW×80%) for 1 hour, which exceeds the maximum electric power controllable in the second electric power output apparatus 30, "2 kW" as described above. In a case where such an unprocessable amount is generated, the unprocessable amount may be allocated to the electric power output apparatus 30 having the next higher reliability.

The output unit 23 transmits, to each of electric power output apparatuses 30 which are determined to output electric power by the arithmetic unit 22, a control signal including control contents (output electric power (W), a time period for output, and the like) of each electric power output apparatus which is determined by the arithmetic unit 22, According to the received control signal, the electric power output apparatus 30 outputs electric power (supplies electric power to the electric power distribution network).

Figure 11:
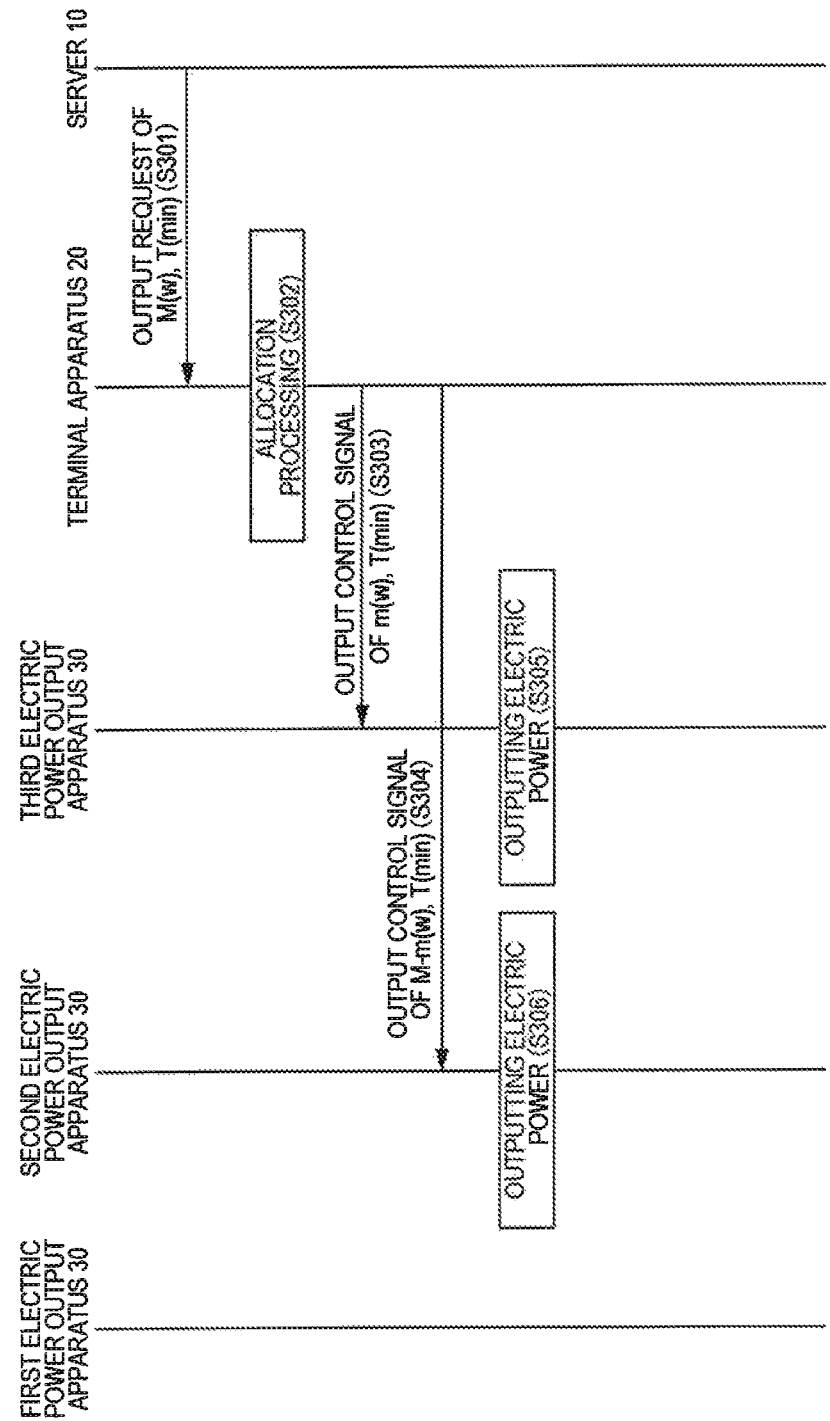
FIG. 11 is a sequence diagram illustrating an example of a processing flow of the management system according to the example embodiment.

Next, an example of the processing flow of the management system according to the example embodiment will be described with reference to the sequence diagram of FIG. 11.

First, the server 10 transmits an output request of electric power to the terminal apparatus 20 (S301). In the illustrated example, an output electric power M(W) and an output time T(min), and the like are defined in the output request.

It should be noted that, in a case where, by processing described in the first and second example embodiments, the server 10 stores a total of rated output or a total of capacities, and the like of electric power output apparatuses 30 to be controlled by each terminal apparatus 20 in association with each terminal apparatus 20, the server 10 may determine contents of an output request to be transmitted to each terminal apparatus 20 using the information. That is, the contents are determined not to exceed the total of rated output or the total of capacities.

Besides, the server 10 may receive, from each terminal apparatus 20, a total of the free capacity, a total of the maximum controllable electric power, or a total of the maximum controllable electric power energy of one or plural electric power output apparatuses 30 to be controlled by each terminal apparatus 20. The terminal apparatus 20 may calculate such information on the basis of state information (for example, an SOC, and the like), controllable information, and the like. Then, the server 10 may determine contents of the output request to be transmitted to each terminal apparatus 20 using such information. That is, the contents are determined not to exceed the total of free capacities, the total of the maximum controllable electric power, the total of the maximum controllable electric power energy, and the like.

When the terminal apparatus 20 receives the output request, the terminal apparatus 20 performs allocation processing (S302), Specifically, the terminal apparatus 20 determines, from among the plural electric power output apparatuses 30 to be controlled, an electric power output apparatus 30 to output electric power in accordance with the output request. The terminal apparatus 20 determines control contents (output electric power (W), a time period for output, and the like) for each of the electric power output apparatuses 30 determined to output electric power Herein, output electric power M−m(W), an output time T(min), and the like are determined for the second electric power output apparatus 30, and output electric power m(W), an output time T(min), and the like are determined for the third electric power output apparatus 30. Then, the first electric power output apparatus 30 is caused not to output.

Thereafter, the terminal apparatus 20 transmits, to each of the electric power output apparatuses 30 which are determined to output electric power, a control signal including control contents (output electric power (W), a time period for output, and the like) determined in association with each electric power output apparatus 30, (S303 and S304). In FIG. 11, control signals are transmitted to the second and third electric power output apparatuses 30.

Thereafter, the electric power output apparatus 30 that received the control signal outputs electric power according to the control signal (S305 and S306).

According to the example embodiment described above, it is possible that the electric power output apparatus 30 having high reliability, that is, the electric power output apparatus 30 having high capacity to output at specified values (values of active electric power, reactive electric power, a voltage, a frequency, a ramp, and the like) preferentially performs output processing in accordance with the output request of electric power. In such a case, output may be expected as per the output request. As a result, the reliability of a service such as demand response is improved.

By the way, in the case of the example embodiment, the electric power output apparatus 30 having high reliability is preferentially used, which increases a load on such an electric power output apparatus 30. Therefore, a predetermined incentive may be given to the electric power output apparatus 30 which have outputted electric power.

Fourth Example Embodiment

The management system according to the example embodiment is based on the configuration of the third example embodiment and is different from that of the third example embodiment in that methods of determining control contents which the arithmetic unit (allocating unit) 22 determine according to each electric power output apparatus 30 are different.

An example of a functional block diagram of the management system according to the example embodiment is illustrated in FIG. 3 or 9. As in the third example embodiment, the example embodiment is different from the first and second example embodiments in that the arithmetic unit 22 of the terminal apparatus 20 includes an allocating unit (not illustrated). Hereinafter, there will be described points different from the third example embodiment.

The arithmetic unit (allocating unit) 22 determines, from among the plural electric power output apparatuses 30 to be controlled, an electric power output apparatus 30 to output electric power in response to the output request from the server 10. The arithmetic unit 22 determines control contents (output electric power (W), a time period for output, and the like) for each of electric power output apparatuses 30 determined to output electric power.

As in the third example embodiment, the arithmetic unit 22 determines the electric power output apparatus 30 having higher reliability as an electric power output apparatus 30 to which a control signal is preferentially transmitted (to output electric power).

In addition to the reliability, the arithmetic unit 22 may determine control contents by using state information and controllable information described in the third example embodiment. Also in this case, the arithmetic unit 22 determines an electric power output apparatus 30 having higher reliability as an electric power output apparatus 30 to which a control signal is referentially transmitted (to output electric power).

In a case where there is an output request of M(W) from the server 10, the arithmetic unit 22 allocates an amount M(W) of electric power to plural electric power output apparatuses 30 to which a control signal is preferentially transmitted. Thereafter, the arithmetic unit 22 calculates corrected electric power (W) obtained by correcting the electric power (W) allocated to each of the electric power output apparatuses 30 with reliability.

Then, the output unit 23 transmits a control signal such that each electric power output apparatus 30 is caused to output at the corrected electric power (W).

Here, a specific example of processing of determining the corrected electric power (W) will be described. For example, it is assumed that there are a first to third electric power output apparatuses 30 as apparatuses to be controlled by a certain terminal apparatus 20. Details of each are as follows.

"First Electric Power Output Apparatus 30"
Reliability: 0.8
Maximum controllable electric power: 2 kW
Maximum controllable electric power energy: 4 kWh
Controllable time period: Any time
Current free capacity: 5 kWh "Second Electric Power Output Apparatus 30"
Reliability: 1.0
Maximum controllable electric power: 2 kW
Maximum controllable electric power energy: 2.5 kWh
Controllable time period: Any time
Current free capacity: 3 kWh "Third Electric Power Output Apparatus 30"
Reliability: 0.9
Maximum controllable electric power: 3 kW
Maximum controllable electric power energy: 3 kWh
Controllable time period: Any time
Current free capacity: 4 kWh Then, it is assumed that there is an output request of "3 kW, 1 hour (Feb. 10, 2016, from 16:00 to 17:00 time)" to the terminal apparatus 20.

In this case, the arithmetic unit 22 causes the second electric power output apparatus 30 having the highest reliability to preferentially output electric power. Herein, it is assumed that control contents are determined such that the second electric power output apparatus 30 is fully utilized to output at "2 kW, 1 hour (Feb. 10, 2016, from 16:00 to 17:00 time)". Then, it is assumed that control contents are determined such that the third electric power output apparatus 30 having the next higher reliability is caused to output at the remainder, that is, "1 kW, 1 hour (Feb. 10, 2016, from 16:00 to 17:00 time)". In this case, it is unnecessary to control the first electric power output apparatus 30 having the lowest reliability and the first electric power output apparatus 30 is caused not to output.

Thereafter, the arithmetic unit 22 corrects electric power allocated to each electric power output apparatus 30. Specifically, a value obtained by multiplying the allocated electric power (W) by the reciprocal of the reliability is calculated as corrected electric power (W). In this case, the smaller the reliability is, the larger the corrected value becomes.

The second electric power output apparatus 30 has the reliability of "1.0" and thus the corrected electric power is "2 kW". On the other hand, the reliability of the third electric power output apparatus 30 is "0.9" and thus the corrected electric power is "1.1 kW".

It should be noted that, herein, although an example of fully utilization in descending order of reliability was described, as in the third example embodiment, this allocation method is merely an example, and is not limited thereto.

According to the received control signal, the electric power output apparatus 30 outputs electric power (supplies electric power to the electric power distribution network).

Figure 12:
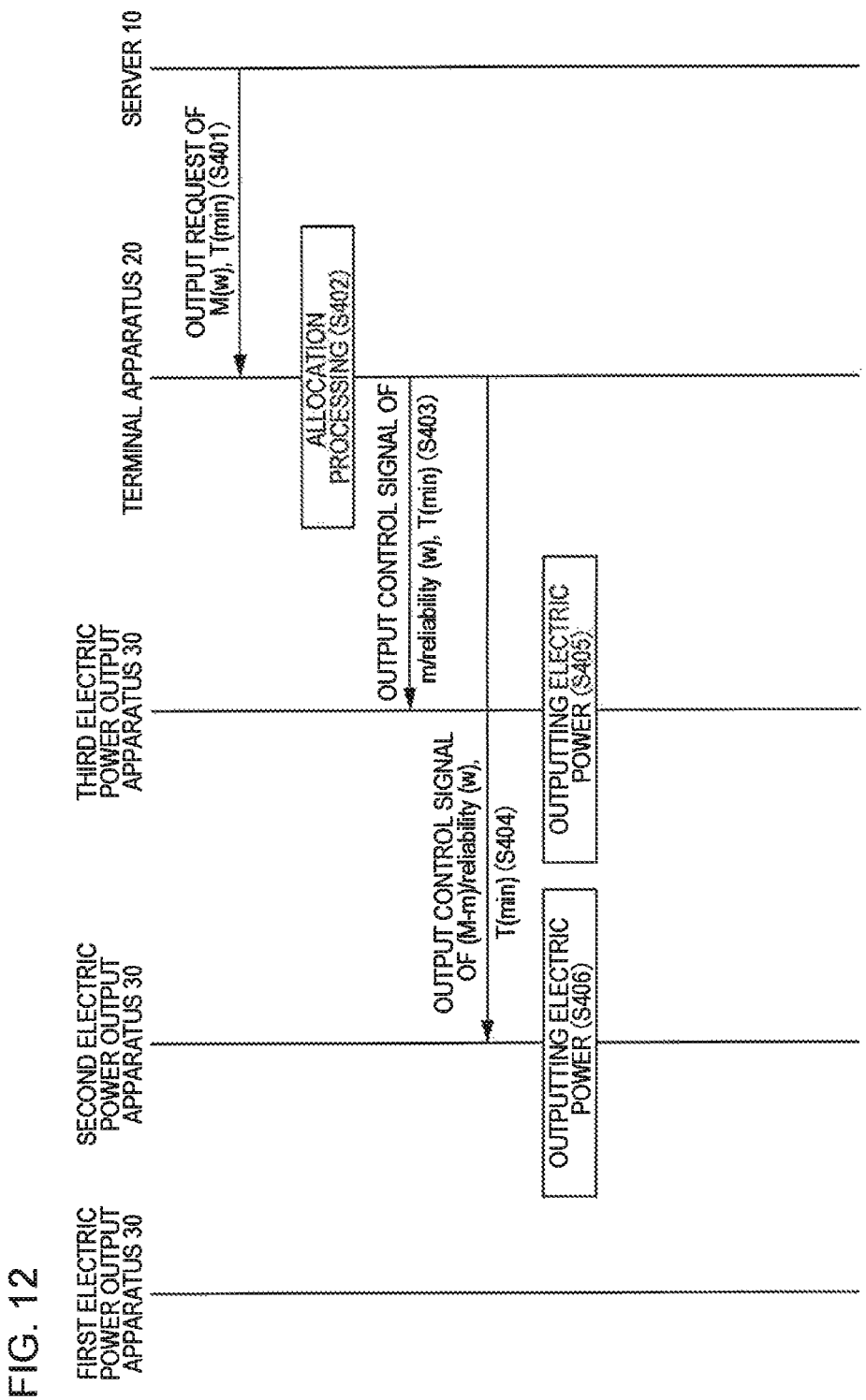
FIG. 12 is a sequence diagram illustrating an example of a processing flow of the management system according to the example embodiment.

Next, an example of the processing flow of the management system according to the example embodiment will be described with reference to the sequence diagram of FIG. 12.

First, the server 10 transmits an output request of electric power to the terminal apparatus 20 (S401). In the illustrated example, an output electric power M(W) and an output time T(min), and the like are defined in the output request.

It should be noted that, in a case where, by processing described in the first and second example embodiments, the server 10 stores a total of rated output or a total of capacities, and the like of electric power output apparatuses 30 to be controlled by each terminal apparatus 20 in association with each terminal apparatus 20, the server 10 may determine contents of an output request to be transmitted to each terminal apparatus 20 using the information. That is, the contents are determined not to exceed the total of rated output or the total of capacities.

Besides, the server 10 may receive, from each terminal apparatus 20, a total of the free capacity, a total of the maximum controllable electric power, a total of the maximum controllable electric power energy, or the like of one or plural electric power output apparatuses 30 to be controlled by each terminal apparatus 20. The terminal apparatus 20 may calculate such information on the basis of the state information (for example, an SOC, and the like), the controllable information, and the like. Then, the server 10 may determine contents of the output request to be transmitted to each terminal apparatus 20 using such information. That is, contents are determined not to exceed the total of free capacities, the total of the maximum controllable electric power, the total of the maximum controllable electric power energy, and the like.

When the terminal apparatus 20 receives the output request, the terminal apparatus 20 performs allocation processing (S402). Specifically, the terminal apparatus 20 determines, from among plural electric power output apparatuses 30 to be controlled, an electric power output apparatus 30 to output electric power in response to the output request, or determines allocation of output electric power M(W) indicated by the output request, and the like. Herein, output electric power M−m(W), an output time T(min), and the like are determined for the second electric power output apparatus 30, and output electric power m(W), an output time T(min), and the like are determined for the third electric power output apparatus 30. Then, the first electric power output apparatus 30 is caused not to output.

Thereafter, the terminal apparatus 20 calculates the corrected electric power (W) by multiplying the output electric power allocated to each electric power output apparatus 30 by the reciprocal of the reliability of each electric power output apparatus 30.

Thereafter, the terminal apparatus 20 transmits, to each of electric power output apparatuses 30 which are determined to output electric power, a control signal including control contents (corrected electric power (W), a time period for output, and the like) determined in associated with each electric power output apparatus 30 (S403 and S404). In FIG. 12, control signals are transmitted to the second and third electric power output apparatuses 30.

Thereafter, the electric power output apparatus 30 that received the control signal outputs electric power according to the control signal (S405 and S406).

According to the example embodiment described above, advantageous effects similar to those of the third example embodiment can be realized. In the case of the example embodiment, it is possible to transmit, to each electric power output apparatus 30, a control signal such that each electric power output apparatus 30 is caused to output corrected electric power (W) obtained by correcting electric power allocated to each electric power output apparatus 30 with the reliability of each electric power output apparatus 30. Then, it is possible to cause each electric power output apparatus 30 to output electric power according to the control signal.

In such a case, it is possible to instruct an electric power output apparatus 30 having actual output lower than electric power specified by the control signal, to output corrected electric power which is accordingly estimated more. This makes it possible to realize desired output even in the electric power output apparatus 30 having low reliability. As a result, the reliability of a service such as demand response is improved.

Fifth Example Embodiment

The example embodiment is based on a premise that the reliability of the electric power output apparatus 30 is stored in the server 10 by the processing described in the first and second example embodiments. On the basis of the premise, output control processing using the reliability will be described.

An example of a functional block diagram of the management system according to the example embodiment is illustrated in FIG. 3 or 9. The example embodiment is different from the first and second example embodiments in that the arithmetic unit 12 of the server 10 includes an allocating unit (not illustrated). Hereinafter, there will be described points different from the first and second example embodiments.

The input unit 11 receives an output request of predetermined electric power allocated to a predetermined terminal apparatus 20. In the output request, output electric power M(W), an output time (hours, minutes, and the like), a time period for output (for example, Feb. 10, 2016, from 15:00 to 16:00 time), and the like are defined.

It should be noted that, in a case where, by processing described in the first and second example embodiments, the server 10 stores a total of rated output or a total of capacities, and the like of electric power output apparatuses 30 to be controlled by each terminal apparatus 20 in association with each terminal apparatus 20, the server 10 may determine contents of an output request to be transmitted to each terminal apparatus 20 using the information. That is, the contents are determined not to exceed the total of rated output or the total of capacities.

Besides, the server 10 may receive, from each terminal apparatus 20, a total of the free capacity, a total of the maximum controllable electric power, or a total of the maximum controllable electric power energy of one or plural electric power output apparatuses 30 to be controlled by each terminal apparatus 20. The terminal apparatus 20 may calculate such information on the basis of the state information (for example, an SOC, and the like), controllable information, and the like. Then, the server 10 may determine contents of the output request to be transmitted to each terminal apparatus 20 using such information. That is, contents are determined not to exceed the total of free capacities, the total of the maximum controllable electric power, the total of the maximum controllable electric power energy, and the like.

A correspondence relationship between each terminal apparatus 20 and the electric power output apparatus 30 to be controlled by each terminal apparatus 20 is stored in the storage unit 14.

The arithmetic unit (allocating unit) 12 specifies plural electric power output apparatuses 30 to be controlled by each terminal apparatus 20 on the basis of the correspondence relationship. Then, from among the plural specified electric power output apparatuses 30, electric power output apparatuses 30 to output electric power in response to the output request are determined. The arithmetic unit 12 determines control contents (output electric power (W), a time period for output, and the like) for each of the electric power output apparatuses 30 determined to output electric power. These processes performed by the Arithmetic unit 12 are realized by the same processes as those of the arithmetic unit (allocating unit) 22 described in the third example embodiment. As described in the third example embodiment, the arithmetic unit 12 may perform determination processing using at least one of the state information and the controllable information of each electric power output apparatus 30 in addition to the reliability of each electric power output apparatus 30.

The arithmetic unit 12 may calculate corrected electric power (W) by the same processing as that of the arithmetic unit (allocating unit) 22 described in the fourth example embodiment.

The output unit 13 transmits, through the terminal apparatus 20, control contents (output electric power (W) or corrected output electric power (W), a time period for output, and the like) of each electric power output apparatus determined by the arithmetic unit 12, to each of electric power output apparatuses 30 determined to output electric power by the arithmetic unit 12. According to the received control signal, the electric power output apparatus 30 outputs electric power (supplies electric power to the electric power distribution network).

Figure 13:
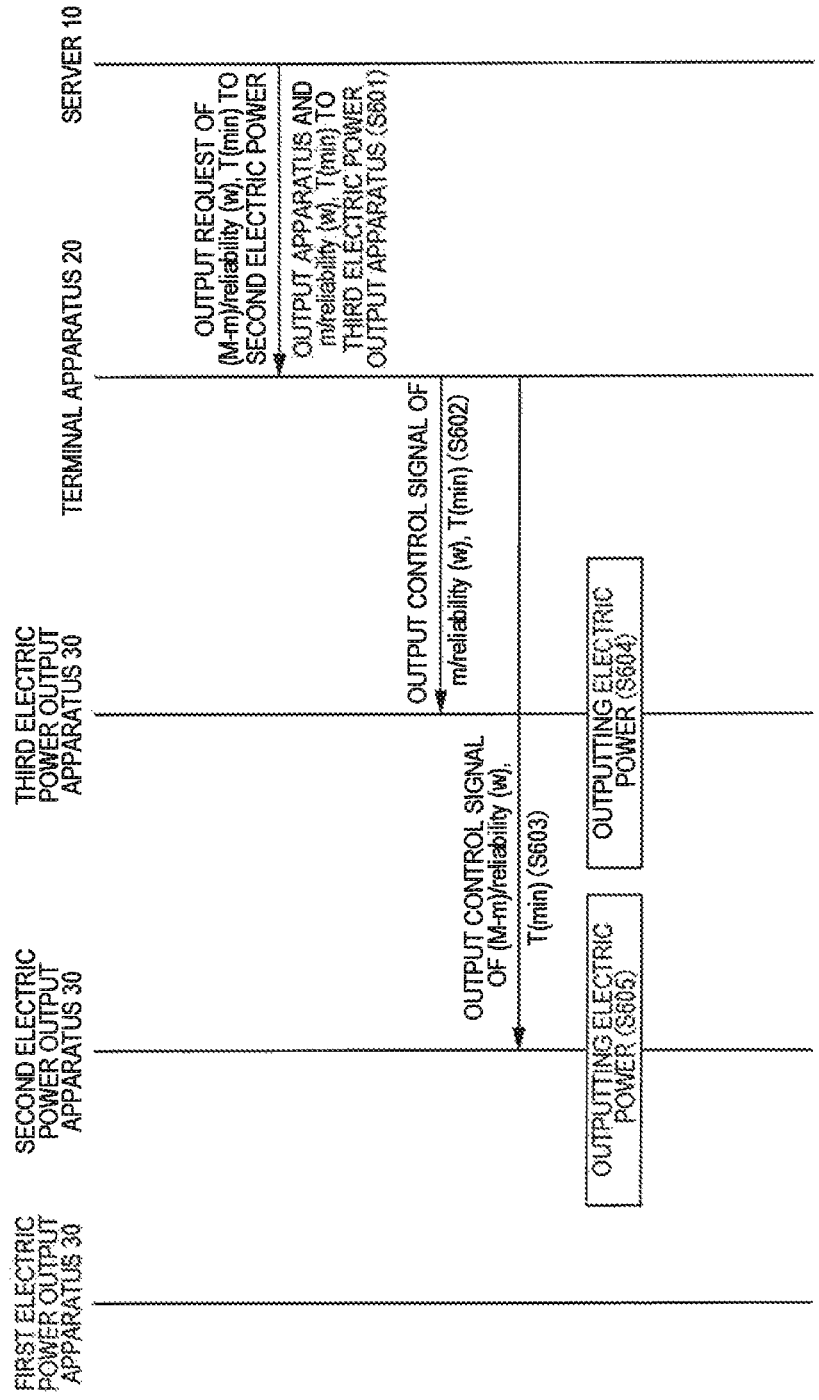
FIG. 13 is a sequence diagram illustrating an example of a processing flow of the management system according to the example embodiment.

Next, an example of the processing flow of the management system according to the example embodiment will be described with reference to the sequence diagram of FIG. 13, Herein, processes of calculating and transmitting the corrected electric power (W) will be described.

First, the server 10 receives an output request of electric power allocated to each terminal apparatus 20. Thereafter, on the basis of "the correspondence relationship between each terminal apparatus 20 and the electric power output apparatus 30 to be controlled by each terminal apparatus 20" stored in the storage unit 14, the server 10 specifies plural electric power output apparatuses 30 to be controlled by each terminal apparatus 20, Then, from among the plural specified electric power output apparatuses 30, electric power output apparatuses 30 to output electric power in response to the output request are determined. The arithmetic unit 12 determines control contents (corrected electric power (W), a time period for output, and the like) for each of the electric power output apparatuses 30 determined to output electric power.

Thereafter, the server 10 transmits, to the terminal apparatus 20, control contents (corrected electric power (W), a time period for output, and the like) of each of the electric power output apparatuses 30 determined to output electric power (S601). On the basis of received information, the terminal apparatus 20 transmits, to the predetermined electric power output apparatus 30, a control signal to perform output according to control contents as indicated by the received information (S602 and S603). In FIG. 13, control signals are transmitted to the second and third electric power output apparatuses 30.

Thereafter, each of the electric power output apparatuses 30 that received the control signal outputs electric power according to the received control signal (S604 and S605).

According to the example embodiment described above, advantageous effects similar to those of the third and fourth example embodiments can be realized.

It should be noted that, configurations of the third to fifth example embodiments may be combined. That is, the server 10 may transmit, to the first terminal apparatus 20, an output request allocated to the terminal apparatus 20. In this case, the first terminal apparatus 20 performs allocation processing (S302 in FIG. 11 and S402 in FIG. 12) as described in the third and fourth example embodiments and transmits a control signal according to the processing result, to plural electric power output apparatuses 30.

On the other hand, for the second terminal apparatus 20 different from the first terminal apparatus 20, as described in the example embodiment, the server 10 may determine control contents of each of electric power output apparatuses 30 to be controlled by the second terminal apparatus 20 and transmit the control contents to the second terminal apparatus 20. In this case, as described in the example embodiment, the second terminal apparatus 20 transmits, to the predetermined electric power output apparatus 30, a control signal to output according to the control contents received from the server 10 on the basis of the information received from the server 10 (S602 and S603 in FIG. 13).

Also, in the modification example, advantageous effects similar to those of the third and fourth example embodiments can be realized. It is not that the server 10 determines all the control contents, but that the server 10 determines a part of the control contents and the terminal apparatus 20 determines the other part of the control contents, and thereby the concentration of a load of processing on the server 10 can be reduced.

Hereinafter, an example of a reference embodiment will be appended.

1. A control apparatus including:

an attribute information receiving unit which receives attribute information of an electric power output apparatus having a function of outputting electric power from the electric power output apparatus;

an output condition transmitting unit which transmits an output condition determined in accordance with the attribute information to the electric power output apparatus;

a processing result receiving unit which receives a processing result obtained by performing predetermined processing on output waveform data at the time when the electric power output apparatus outputs electric power according to the output condition; and an evaluating unit which calculates a reliability of an electric power output performance of the electric power output apparatus on the basis of the processing result and the output condition.

2. The control apparatus described in 1, in which, in the output condition, a value of at least one item of active electric power, reactive electric power, a voltage, a frequency, and a change amount of electric power during a predetermined time is specified.

3. The control apparatus described in 1 or 2, in which the output waveform data is alternating current waveform data, and the processing result receiving unit receives a measured value of at least one of active electric power, reactive electric power, a voltage, a frequency, and a change amount of electric power during a predetermined time obtained by performing predetermined processing on the alternating current waveform data.

4. The control apparatus described in 2,
in which, for each output condition, a specified value of output is defined corresponding to each item, and
the evaluating unit calculates the reliability on the basis of how much the processing result deviates from the specified value.

5. The control apparatus described in any one of 1 to 4, further including:
an output unit which transmits, to a terminal apparatus which controls operation of one or plural electric power output apparatuses, the reliability of the electric power output apparatus to be controlled.

6. The control apparatus described in any one of 1 to 5, further including:
an allocating unit which determines the electric power output apparatus to output electric power in response to an output request, on the basis of the reliability corresponding to each electric power output apparatus; and
an output unit which transmits a control signal to the electric power output apparatus.

7. The control apparatus described in 6,
in which the allocating unit determines the electric power output apparatus having relatively higher reliability compared to the other electric power output apparatuses as the electric power output apparatus to which the control signal is transmitted.

8. The control apparatus described in 6,
in which the allocating unit determines the electric power output apparatus to which the control signal is transmitted, in order from the electric power output apparatus having high reliability.

9. The control apparatus described in 6,
in which the higher the reliability of the electric power output is, the more output the allocating unit allocates to the electric power output apparatus.

10. The control apparatus described in 6,
in which the allocating unit determines the electric power output apparatus to which the control signal is transmitted on the basis of at least one of state information and controllable information of the electric power output apparatus, in addition to the reliability.

11. The control apparatus described in 6,
in which, with respect to electric power allocated to each electric power output apparatus, the allocating unit calculates corrected electric power obtained by correcting the electric power on the basis of the reliability of each electric power output apparatus, and
the output unit transmits a control signal related to the corrected electric power to the electric power output apparatus.

12. The control apparatus described in 6,
in which, with respect to electric power allocated to each electric power output apparatus, the allocating unit calculates the corrected electric power corrected so as to increase the electric power as the reliability of each of the electric power output apparatuses is smaller.

13. The control apparatus described in 6,
in which, in the case where the plural electric power output apparatuses are requested for a total amount M(W) of output, the allocating unit allocates an amount M(W) of electric power to the plural electric power output apparatuses to which the output request is transmitted, and calculates corrected electric power (W) obtained by correcting electric power (W) allocated to each electric power output apparatus with the reliability, and
the output unit transmits a control signal of the corrected electric power (W).

14. A server having the control apparatus described in any one of 1 to 13.

15. A terminal apparatus including:
an attribute information receiving unit which receives attribute information of an electric power output apparatus having a function of outputting electric power from the electric power output apparatus;
an output condition transmitting unit which transmits an output condition determined in accordance with the attribute information to the electric power output apparatus;
an output data receiving unit which receives output waveform data at the time when the electric power output apparatus outputs electric power according to the output condition; and
an evaluating unit which calculates a reliability of an electric power output performance of the electric power output apparatus on the basis of the output waveform data and the output condition.

16. The terminal apparatus described in 15,
in which, in the output condition, a value of at least one item of active electric power, reactive electric power, a voltage, a frequency, and a change amount of electric power during a predetermined time is specified.

17. The terminal apparatus described in 15 or 16,
in which the output data receiving unit receives alternating current waveform data as output waveform data, and
the output unit transmits a measured value of at least one of active electric power, reactive electric power, a voltage, a frequency, and a change amount of electric power during a predetermined time as the processing result.

18. The terminal apparatus described in 15,
in which, for each output condition, a specified value of output is defined corresponding to each item, and
the evaluating unit calculates the reliability on the basis of how much the processing result deviates from the specified value.

19. The terminal apparatus described in any one of 15 to 18, further including:
an allocating unit which determines the electric power output apparatus to output electric power in response to an output request by a control signal, on the basis of the reliability corresponding to each electric power output apparatus; and
an output unit which transmits the control signal to the electric power output apparatus.

20. The terminal apparatus described in 19,
in which the allocating unit determines an electric power output apparatus having relatively high reliability compared to the other electric power output apparatuses as the electric power output apparatus to which the control signal is transmitted.

21, The terminal apparatus described in 19,
in which the allocating unit determines the electric power output apparatus to which the control signal is transmitted, in order from the electric power output apparatus having high reliability.

22. The terminal apparatus described in 19,
in which the higher the reliability of the electric power output is, the more output the allocating unit allocates to the electric power output apparatus.

23. The terminal apparatus described in 19,
in which the allocating unit determines the electric power output apparatus to which the control signal is transmitted on the basis of at least one of state information and controllable information of each electric power output apparatus, in addition to the reliability.

24. The terminal apparatus described in 19,
in which, with respect to electric power allocated to each electric power output apparatus, the allocating unit calculates corrected electric power obtained by correcting the electric power on the basis of the reliability of each electric power output apparatus, and
the output unit transmits a control signal related to the corrected electric power.

25. The terminal apparatus described in 19,
in which, with respect to electric power allocated to each electric power output apparatus, the allocating unit calculates the corrected electric power corrected to increase the electric power as the reliability of each of the electric power output apparatuses is smaller.

26. The terminal apparatus described in 19,
in which, in a case where there is the output request of M(W) from a control apparatus, the allocating unit allocates an amount M(W) of electric power to the plural electric power output apparatuses to which the control signal is transmitted, and calculates corrected electric power (W) obtained by correcting electric power (W) allocated to each electric power output apparatus with the reliability, and
the output unit transmits, to the electric power output apparatus, the control signal so as to output at the corrected electric power (W).

27. An evaluation method which is executed by a computer, the method including:
an attribute information receiving step of receiving attribute information of an electric power output apparatus having a function of outputting electric power from the electric power output apparatus;
an output condition transmitting step of transmitting, to the electric power output apparatus, an output condition determined in accordance with the attribute information;
a processing result receiving step of receiving a processing result obtained by performing predetermined processing on output waveform data at the time when the electric power output apparatus outputs electric power according to the output condition; and
an evaluating step of calculating a reliability of an electric power output performance of the electric power output apparatus on the basis of the processing result and the output condition.

28. An evaluation method which is executed by a computer, the method including:
an attribute information receiving step of receiving attribute information of an electric power output apparatus having a function of outputting electric power from the electric power output apparatus;
an output condition transmitting step of transmitting, to the electric power output apparatus, an output condition determined in accordance with the attribute information;
an output data receiving step of receiving output waveform data at the time when the electric power output apparatus outputs electric power according to the output condition; and
an evaluating step of calculating a reliability of an electric power output performance of the electric power output apparatus on the basis of the output waveform data and the output condition.

29. A program that causes a computer to function as:
an attribute information receiving unit which receives attribute information of an electric power output apparatus having a function of outputting electric power from the electric power output apparatus;
an output condition transmitting unit which transmits, to the electric power output apparatus, an output condition determined in accordance with the attribute information;
a processing result receiving unit which receives a processing result obtained by performing predetermined processing on output waveform data at the time when the electric power output apparatus outputs electric power according to the output condition; and
an evaluating unit which calculates a reliability of an electric power output performance of the electric power output apparatus on the basis of the processing result and the output condition.

30. A program that causes a computer to function as:
an attribute information receiving unit which receives attribute information of an electric power output apparatus having a function of outputting electric power from the electric power output apparatus;
an output condition transmitting unit which transmits, to the electric power output apparatus, an output condition determined in accordance with the attribute information;
an output data receiving unit which receives output waveform data at the time when the electric power output apparatus outputs electric power according to the output condition; and
an evaluating unit which calculates a reliability of an electric power output performance of the electric power output apparatus on the basis of the output waveform data and the output condition.

This application claims priority on the basis of Japanese Patent Application No. 2016-042202 filed on Mar. 4, 2016, the disclosure of which is incorporated herein in its entirety.

The invention claimed is:
1. An apparatus comprising:
a memory storing instructions; and
a processor configured to execute the instructions to:
receive attribute information of an electric power output apparatus having a function of outputting electric power from the electric power output apparatus;
transmit an output condition determined in accordance with the attribute information to the electric power output apparatus;
receive output waveform data at the time when the electric power output apparatus outputs electric power according to the output condition, or a processing result obtained by performing predetermined processing on the output waveform data; and
calculate a reliability of an electric power output performance of the electric power output apparatus on the basis of the processing result and the output condition, or on the basis of the output waveform data and the output condition.

2. The apparatus according to claim 1, wherein, in the output condition, a value of at least one item of active electric power, reactive electric power, a voltage, a frequency, and a change amount of electric power during a predetermined time is specified.

3. The apparatus according to claim 2,
wherein, for each output condition, a specified value of output is defined corresponding to each item, and
the processor is further configured to execute the instructions to calculate the reliability on the basis of how much the processing result deviates from the specified value.

4. The apparatus according to claim 1,
wherein the output waveform data is alternating current waveform data, and the processing result is a measured value of at least one of active electric power, reactive electric power, a voltage, a frequency, and a change amount of electric power during a predetermined time obtained by performing predetermined processing on the alternating current waveform data.

5. The apparatus according to claim 1, wherein the processor is further configured to execute the instructions to:
determine an electric power output apparatus to output electric power from a plurality of electric power output apparatuses in response to an output request, on the basis of the reliability corresponding to each electric power output apparatus of the plurality of electric power output apparatuses; and
transmit a control signal to the electric power output apparatus.

6. The apparatus according to claim 5, wherein the processor is further configured to execute the instructions to:
determine an electric power output apparatus having relatively higher reliability compared to the other electric power output apparatuses of the plurality of electric power output apparatuses as the electric power output apparatus to which the control signal is transmitted.

7. The apparatus according to claim 6, wherein the processor is further configured to execute the instructions to:
determine the electric power output apparatuses to which the control signal is transmitted, in order, from the electric power output apparatus having higher reliability to an electric power output apparatus having lower reliability.

8. The apparatus according to claim 5,
wherein the higher the reliability of an electric power output apparatus of the plurality of electric power output apparatuses is, the more output is allocated to the electric power output apparatus.

9. The apparatus according to claim 5, wherein the processor is further configured to execute the instructions to:
determine the electric power output apparatuses to which the control signal is transmitted on the basis of at least one of state information and controllable information of each electric power output apparatus of the plurality of electric power output apparatuses, in addition to the reliability.

10. The apparatus according to claim 5,
wherein, with respect to electric power allocated to each electric power output apparatus of the plurality of electric power output apparatuses, the processor is configured to execute the instructions to calculate corrected electric power obtained by correcting the electric power on the basis of the reliability of each electric power output apparatus, and
wherein the processor is further configured to execute the instructions to transmit a control signal related to the corrected electric power to the electric power output apparatus.

11. The apparatus according to claim 10,
wherein, with respect to electric power allocated to each electric power output apparatus, the processor is configured to execute the instructions to calculate the corrected electric power corrected so as to increase the electric power as the reliability of each of the electric power output apparatuses decreases.

12. The apparatus according to claim 5,
wherein, in the case where a subset of the plurality of electric power output apparatuses is requested for a total amount M(W) of output, the processor is configured to execute the instructions to allocate an amount M(W) of electric power to the subset plurality of the electric power output apparatuses to which the output request is transmitted, and calculate corrected electric power (W) obtained by correcting electric power (W) allocated to each electric power output apparatus with the reliability, and
the processor is further configured to execute the instructions to transmit a control signal to output the corrected electric power (W).

13. An evaluation method which is executed by a computer, the method comprising:
an attribute information receiving step of receiving attribute information of an electric power output apparatus having a function of outputting electric power from the electric power output apparatus;
an output condition transmitting step of transmitting, to the electric power output apparatus, an output condition determined in accordance with the attribute information;
a receiving step of receiving output waveform data at the time when the electric power output apparatus outputs electric power according to the output condition, or a processing result obtained by performing predetermined processing on the output waveform data; and
an evaluating step of calculating a reliability of an electric power output performance of the electric power output apparatus on the basis of the processing result and the output condition, or on the basis of the output waveform data and the output condition.

14. A non-transitory storage medium storing a program that causes a computer to perform the following method:
receive attribute information of an electric power output apparatus having a function of outputting electric power from the electric power output apparatus;
transmit, to the electric power output apparatus, an output condition determined in accordance with the attribute information;
receive output waveform data at the time when the electric power output apparatus outputs electric power according to the output condition, or a processing result obtained by performing predetermined processing on the output waveform data; and
calculate a reliability of an electric power output performance of the electric power output apparatus on the basis of the processing result and the output condition, or on the basis of the output waveform data and the output condition.

15. The apparatus according to claim 1, wherein the apparatus is a server or a terminal apparatus.

\* \* \* \* \*